(12) United States Patent
Nishida

(10) Patent No.: US 11,914,847 B2
(45) Date of Patent: *Feb. 27, 2024

(54) GAME PROGRAM, COMPUTER CONTROL METHOD, AND INFORMATION PROCESSING APPARATUS

(71) Applicant: GREE, Inc., Tokyo (JP)

(72) Inventor: Ryosuke Nishida, Tokyo (JP)

(73) Assignee: GREE, Inc., Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 17/375,252

(22) Filed: Jul. 14, 2021

(65) Prior Publication Data

US 2021/0342061 A1 Nov. 4, 2021

Related U.S. Application Data

(63) Continuation of application No. 15/855,056, filed on Dec. 27, 2017, now Pat. No. 11,093,121, which is a
(Continued)

(30) Foreign Application Priority Data

Oct. 28, 2014 (JP) ................................ 2014-219095
Jun. 30, 2015 (JP) ................................ 2015-131966

(51) Int. Cl.
*G06F 3/0488* (2022.01)
*A63F 13/2145* (2014.01)
(Continued)

(52) U.S. Cl.
CPC ...... *G06F 3/04842* (2013.01); *A63F 13/2145* (2014.09); *A63F 13/426* (2014.09);
(Continued)

(58) Field of Classification Search
CPC ............ G06F 3/04842; G06F 3/04883; G06F 3/0488; A63F 13/426; A63F 13/828; A63F 13/2145
See application file for complete search history.

(56) References Cited

U.S. PATENT DOCUMENTS 4,391,444 A 7/1983 Bromley
5,080,368 A 1/1992 Weisser
(Continued)

FOREIGN PATENT DOCUMENTS

JP 2009-119288 A 6/2009
JP 2012-147936 A 8/2012
(Continued)

OTHER PUBLICATIONS

Japanese Office Action dated Mar. 10, 2015 in corresponding Japanese Application No. 2014-219095; 6 pgs.
(Continued)

*Primary Examiner* — Ryan F Pitaro
(74) *Attorney, Agent, or Firm* — Maier & Maier, PLLC

(57) ABSTRACT

A computer-implemented method for operating a computer game involving moving a plurality of objects. A game screen on which a plurality of objects are displayed may be displayed on a touchscreen. If a swipe operation is detected, a plurality of the objects may be moved. If a swipe operation is detected while a touch operation that specifies any of the plurality objects is also being detected, the plurality of objects excluding the object specified with the touch operation are collectively moved in a direction indicated by the swipe operation.

20 Claims, 12 Drawing Sheets

Related U.S. Application Data continuation of application No. 14/923,503, filed on Oct. 27, 2015, now Pat. No. 9,891,799.

(51) Int. Cl.
| | |
|---|---|
| *G06F 3/04842* | (2022.01) |
| *A63F 13/828* | (2014.01) |
| *A63F 13/426* | (2014.01) |
| *G06F 3/04883* | (2022.01) |

(52) U.S. Cl.
CPC .......... *A63F 13/828* (2014.09); *G06F 3/0488* (2013.01); *G06F 3/04883* (2013.01)

(56) References Cited

U.S. PATENT DOCUMENTS

| | | | |
|---|---|---|---|
| 6,388,667 | B1 | 5/2002 | Sato et al. |
| 8,146,018 | B2 | 3/2012 | Shimura et al. |
| 10,198,157 | B2* | 2/2019 | Haussila ............... A63F 13/822 |
| 11,093,121 | B2* | 8/2021 | Nishida ............... G06F 3/04883 |
| 2005/0176502 | A1 | 8/2005 | Nishimura et al. |
| 2005/0197186 | A1 | 9/2005 | Ohta |
| 2006/0238498 | A1 | 10/2006 | Kando et al. |
| 2008/0026843 | A1 | 1/2008 | Nakasaka |
| 2008/0146328 | A1 | 6/2008 | Ishii et al. |
| 2008/0207323 | A1* | 8/2008 | Hiroshige ............. A63F 13/525 463/32 |
| 2009/0170600 | A1 | 7/2009 | Komatsumoto |
| 2010/0048276 | A1 | 2/2010 | Wang |
| 2010/0210359 | A1* | 8/2010 | Krzeslo ................. A63F 13/213 463/31 |
| 2012/0056849 | A1 | 3/2012 | Kasahara et al. |
| 2012/0311484 | A1* | 12/2012 | Amano ............... A63F 13/5255 715/782 |
| 2013/0123014 | A1 | 5/2013 | Ito et al. |
| 2013/0316817 | A1 | 11/2013 | Tanzawa et al. |
| 2013/0331182 | A1 | 12/2013 | Tanzawa et al. |
| 2014/0066195 | A1 | 3/2014 | Matsui et al. |
| 2014/0121012 | A1 | 5/2014 | Tagawa et al. |
| 2014/0274239 | A1* | 9/2014 | Han .................... A63F 13/5372 463/2 |
| 2014/0335951 | A1 | 11/2014 | Matsunaga |
| 2014/0357356 | A1 | 12/2014 | Horie |
| 2015/0094127 | A1 | 4/2015 | Canose et al. |
| 2018/0028906 | A1 | 2/2018 | Tang et al. |
| 2019/0299093 | A1 | 10/2019 | Kamfjord |
| 2020/0193677 | A1* | 6/2020 | Vaganov ................ A63F 13/65 |

FOREIGN PATENT DOCUMENTS

| | | |
|---|---|---|
| JP | 2013-105408 A | 5/2013 |
| JP | 2013-255607 A | 12/2013 |
| JP | 2014-83395 A | 5/2014 |

OTHER PUBLICATIONS

Pikmin Pikmin, Dengeki GB Advance, Media Works, pp. 6-25; 24 pgs.
"IOS version great labyrinth of the thief and the starry sky has delivered—a little surly thief Princess, in an Adventure RPG", gamer, Oct. 20, 2014, URL: http://www.gamer.ne.jp/news/201410200047/.
"Collect treasure Adventure RPG big labyrinth of the thief and the starry sky, iOS version delivery will start", 4Gamer.net, Oct. 20, 2014, URL: http://www.4gamer.net/games/278/G027847/20141020059/.
"A little easy rice upload Adventure RPG blunt Princess following the great labyrinth of the thief and the starry sky Android version iOS launched", 9-Bit, Oct. 20, 2014, URL: http://9-bit.jp/archives/86452.
"Wright Flyer Studios' Garage, the great labyrinth of the thief and the starry sky in the AppStore launches.", AppliBiz, Oct. 20, 2014, URL: http://www.applibiz.net/7228/.
"Released iOS version of RPG 1 swipe in the Wright Flyer Studios can enjoy invigorating play the great labyrinth of the thief and the starry sky", Social Game Info, Oct. 20, 2014, URL: http://gamebiz.jp/?p=135808.
"Wright Flyer Studios, released the iOS version of the Smartphone-friendly swipe action RPG big labyrinth of the thief and the starry sky", vsmedia, Oct. 20, 2014, URL: http://vsmedia.info/2014/10/20/kaitouhime_ios/.
"Released iOS version of the great labyrinth of the thief and the starry sky! Manipulate a cute Princess Adventure RPG", Gpara.com, Oct. 20, 2014, URL: http://www.gpara.com/infos/view/17575.
"Easy operation and strategic game of great labyrinth of the thief and the starry sky] is finally in the iOS version! Collect the treasure as well as Princess!", TAPPLI, Oct. 20, 2014, URL: http://tappli.org/news-detail.php?id=785.
"Collect the treasures "—jewel" Wright Flyer Studios, cute thief Princess Adventure RPG dungeons of the thief and the stars' Android version available", Social Game Info, Aug. 22, 2014, URL: http://gamebiz.jp/?p=133820.
"At your fingertips to enemies in RPG to great labyrinth of the thief and the starry sky for the Android delivered", 4Gamer.net, Aug. 22, 2014, URL: http://www.4gamer.net/games/270/G027087/20140822075/.
"Wright Flyer Studios' Garage and release Android Smartphone-friendly swipe action RPG big labyrinth of the thief and the starry sky", vsmedia, Aug. 22, 2014, URL: http://vsmedia.info/2014/08/22/wrightflyer_kaitouhime/.
"Around the great labyrinth cute and a little surly thief Princess floating in the sky! Released Android great labyrinth of the thief and the starry sky", gamer, Aug. 22, 2014, URL: http://www.gamer.ne.jp/news/201408220072/.
"Disappearing city flyer Studios latest adventure Dungeon RPG of the great labyrinth of the thief and the starry sky launched for Android a little surly Princess!", 9-Bit, Aug. 22, 2014, URL: http://9-bit.jp/archives/75630.
"Adventure RPG is the great labyrinth of the thief and the starry sky thief Princess cute! Deliver the Android version", Gpara.com, Aug. 22, 2014, URL: http://www.gpara.com/infos/view/15552.
"Glee, the Wright Flyer Studios' the great labyrinth of the thief and the starry sky for Android launched from the Garage.", AppliBiz, Aug. 22, 2014, URL: http://www.applibiz.net/5056/.
"[Games played today: Dungeon RPG dungeons-trotting thief Princess the great labyrinth of the thief and the starry sky", Apliget, Aug. 25, 2014, URL: http://appget.com/c/news/65759/pickup20140825/.
"Thief princess and the starry sky of large Labyrinth is providing start the Android version!", GREE Facebook, Aug. 22, 2014, URL: https://www.facebook.com/GREEofficial/photos/a.218023364887008.56936.212867592069252/790151134340892/?type=1&theater.
"Let's march with this cute and pretty thief princess to find treasures!", Aplistyle, Nov. 2014.
Japanese Office Action dated Feb. 16, 2016 in corresponding Japanese Application No. 2015-131966; 11 pgs.
"Kaito princess and the starry sky of the large labyrinth", YouTube, Wright Flyer Studios, Published on Jun. 5, 2014, Accessed on Feb. 4, 2016, URL: https://www.youtube.com/watch?v=zTFdYD2Q9A8.
Japanese Office Action dated Jun. 7, 2016 in corresponding Japanese Application No. 2015-131966; 6 pgs.
Exhibit 2012: Declaration of Michael Shamos in Support of Patent Owner's Response, in connection with USPTO, PTAB, *Supercell Oy*, Petitioner, v. *Gree, Inc.*, Patent Owner, Post Grant Review No. 2019-00018, U.S. Pat. No. 9,891,799, 154 pages.
Paper: Patent Owner's Response Pursuant to 37 C.F.R. § 42.220, in connection with USPTO, PTAB, *Supercell Oy*, Petitioner, v. *Gree, Inc.*, Patent Owner, Post Grant Review No. 2019-00018, U.S. Pat. No. 9,891,799, 69 pages.
Exhibit 1005: Deposition Transcript of Michael Shamos, Ph.D., in connection with USPTO, PTAB, *Supercell Oy*, Petitioner, v. *Gree, Inc.*, Patent Owner, Post Grant Review No. 2019-00018, U.S. Pat. No. 9,891,799, 240 pages.
Paper: Petitioner's Reply to Patent Owner's Response, in connection with USPTO, PTAB, *Supercell Oy*, Petitioner, v. *Gree, Inc.*, Patent Owner, Post Grant Review No. 2019-00018, U.S. Pat. No. 9,891,799, 35 pages.

(56) References Cited

OTHER PUBLICATIONS

Exhibit 1006: Certified English Translation of Kokai Publication No. JP2009-119288, in connection with USPTO, PTAB, *Supercell Oy*, Petitioner, v. *Gree, Inc.*, Patent Owner, Post Grant Review No. 2019-00018, U.S. Pat. No. 9,891,799, 64 pages.
Paper: Patent Owner's Sur-Reply to Petitioner's Reply, in connection with USPTO, PTAB, *Supercell Oy*, Petitioner, v. *Gree, Inc.*, Patent Owner, Post Grant Review No. 2019-00018, U.S. Pat. No. 9,891,799, 13 pages.
Paper: In the United States Court of Appeals for the Federal Circuit, Document No. 16, Case/Appeal No. 20-2125, *Gree, Inc.* (Appellant) v. *Supercell Oy* (Appellee), Response Brief of Appellee Supercell Oy, filed on Jan. 23, 2021, on appeal from the United States Patent and Trademark Office, Patent Trial and Appeal Board in No. PGR2019-00018, 51 pp.
Paper: Brief of Appellant, No. 20-2125, filed on Nov. 13, 2020, in connection with USPTO, *Gree, Inc.*, Appellant, v. *Supercell Oy*, Appellee, Post Grant Review No. 2019-00018, pp. 154.
Paper: Patent Owner's Preliminary Response Pursuant to 37 C.F.R. § 42.207(a), dated Mar. 4, 2019, in connection with USPTO, PTAB, *Supercell Oy*, Petitioner, v. *Gree, Inc.*, Patent Owner, Post Grant Review No. 2019-00018, U.S. Pat. No. 9,891,799, 82 pages.
Exhibit 2003: L. Zaman et al., Touchscreens vs Traditional Controllers in Handheld Gaming, Department of Computer Science and Engineering, 8 pages.
Exhibit 2001: Declaration of Michael Shamos, in connection with USPTO, PTAB, *Supercell Oy*, Petitioner, v. *Gree, Inc.*, Patent Owner, Post Grant Review No. 2019-00018, U.S. Pat. No. 9,891,799, 131 pages.
Exhibit 2002: K. Browne et al., An Empirical Evaluation of User Interfaces for a Mobile Video Game, Preprint submitted to Entertainment Computing, Jun. 11, 2011, 14 pages.
Exhibit 2005: M. Prensky, Fun, Play and Games: What Makes Games Engaging, Digital Game-Based Learning (McGraw-Hill, 2001), 31 pages.
Exhibit 2004: T. Gu, Why are Computer Games so Entertaining?, KTH Computer Science and Communication, 2011, 100 pages.
Exhibit 2011: Declaration of Andrew J. Sutton in Support of Patent Owner's Preliminary Response, in connection with USPTO, PTAB, *Supercell Oy*, Petitioner, v. *Gree, Inc.*, Patent Owner, Post Grant Review No. 2019-00018, U.S. Pat. No. 9,891,799, 5 pages.
Paper: No. 8, Decision Granting Institution of Post-Grant Review 35 U.S.C. § 324(a), issued Jun. 3, 2019, in connection with USPTO, PTAB, *Supercell Oy*, Petitioner, v. *Gree, Inc.*, Patent Owner, Post Grant Review No. 2019-00018, U.S. Pat. No. 9,891,799, 27 pages.
Paper: Reply Brief of Appellant, Document No. 23, Case No. 20-2125, *Gree, Inc.* (Appellant) v. *Supercell Oy* (Appellee), filed on Feb. 12, 2021, on appeal from the United States Patent and Trademark Office, Patent Trial and Appeal Board in No. PGR2019-00018, 42 pp.
Paper: Petition for Post Grant Review of U.S. Pat. No. 9,891,799, dated Nov. 13, 2018, in connection with USPTO, PTAB, *Supercell Oy*, Petitioner, v. *Gree, Inc.*, Patent Owner, Post Grant Review No. TBD, U.S. Pat. No. 9,891,799, 75 pages.
Exhibit 1003: English Translation and Certification of Japanese Unexamined Patent Application Publication No. 2012-147936, 56 pages.
Document 39, Decision from the United States Court of Appeals for the Federal Circuit, *Gree, Inc.*, Appellant v. *Supercell Oy*, Appellee, Case 20-2125, Decided May 10, 2021, 6 pp.
Simon Tay, "Clash of Clans—Part 12—Giants and Dragons!", Dec. 3, 2012, Youtube, https://www.youtube.com/watch?v=vtJkzWvjhqo (Year: 2012).

\* cited by examiner

FIG. 2

| | 1 | 2 | 3 | 4 | 5 | 6 |
|---|---|---|---|---|---|---|
| a | | | | | | |
| b | | 300i | 300j | | | |
| c | | 300e | 300f | 300g | 300h | |
| d | | 300a | 300b | 300c | 300d | |
| e | | | | | | |
| f | | | | | | |
| g | | 310a | 310b | 310c | × | × |
| h | | 310d | 310e | 310f | × | × |
| ⋮ | ⋮ | ⋮ | ⋮ | ⋮ | ⋮ | ⋮ |

200

GAME PROGRAM, COMPUTER CONTROL METHOD, AND INFORMATION PROCESSING APPARATUS

CLAIM OF PRIORITY

This application claims priority from U.S. patent application Ser. No. 15/855,056, filed on Dec. 27, 2017, entitled "GAME PROGRAM, COMPUTER CONTROL METHOD, AND INFORMATION PROCESSING APPARATUS," which in turn claims priority from U.S. patent application Ser. No. 14/923,503, now U.S. Pat. No. 9,891,799, filed on Oct. 27, 2015, entitled "GAME PROGRAM, COMPUTER CONTROL METHOD, AND INFORMATION PROCESSING APPARATUS," the entire contents of which are hereby incorporated by reference.

BACKGROUND

Hitherto, network games using electronic devices such as smart phones and tablet terminals have been actively developed.

For example, Japanese Unexamined Patent Application Publication No. 2012-147936 discloses a game apparatus and a game control program for implementing a baseball game in which the player of the game can minutely change and adjust the positions of player characters in the baseball game, while alleviating the operation burden on the player of the game. According to Japanese Unexamined Patent Application Publication No. 2012-147936, the game apparatus stores group information indicating the corresponding relationship between the player characters and a plurality of groups into which the characters are classified according to their roles in the game. Japanese Unexamined Patent Application Publication No. 2012-147936 discloses that a contact in a detection target area of a screen is detected, a group corresponding to the detected portion is identified, and characters corresponding to the identified group are simultaneously moved by a certain distance in a direction toward the detected portion.

However, although the configuration in Japanese Unexamined Patent Application Publication No. 2012-147936 is capable of simultaneously moving a plurality of characters included in a group by a certain distance, the configuration is incapable of causing the characters to make complex movements. Accordingly, the game is minimally strategic.

SUMMARY

An exemplary embodiment of the present invention provides a game program with enhanced strategic gameplay in which a plurality of characters are operated with simple operation, a computer control method, and an information processing apparatus.

According to an exemplary embodiment of the present invention, there may be provided a game program that processes progress of a game for moving a plurality of objects arranged on a game field. The game program may cause a computer to implement an accepting function that accepts operation information regarding a touch operation performed by a user, from a certain input face capable of detecting the touch operation; an associating function that associates the plurality of objects as a group; a moving function that may move, in a case where the operation information is a direction operation indicating a certain direction, the plurality of associated objects as a group in the direction indicated by the direction operation; and a display processing function that may display the game field and the plurality of objects arranged on the game field on a screen of the game, and, in a case where a moving process is performed by the moving function, may move and display the plurality of objects in accordance with the moving process. Upon acceptance of the direction operation as the operation information while a specifying operation that specifies a first object that is any of the plurality of objects is being accepted as the operation information, the moving function may move the remaining objects, excluding the first object from the plurality of objects, as a group in the direction indicated by the direction operation.

According to another exemplary embodiment of the present invention, there may be provided a computer control method that may control a computer that processes progress of a game involving moving a plurality of objects arranged on a game field. The method may include an accepting step in which operation information regarding a touch operation performed by a user may be accepted, from a certain input face capable of detecting the touch operation; an associating step in which the plurality of objects may be associated as a group; a moving step that may include moving, in a case where the operation information is a direction operation indicating a certain direction, the plurality of associated objects as a group in the direction indicated by the direction operation; and a display processing step that may include displaying the game field and the plurality of objects arranged on the game field on a screen of the game, and, in a case where a moving process is performed in the moving step, that may include displaying the plurality of objects in accordance with the moving process. Upon acceptance of the direction operation as the operation information while a specifying operation that specifies a first object that is any of the plurality of objects is being accepted as the operation information, the remaining objects may be moved in the moving step, excluding the first object from the plurality of objects, as a group in the direction indicated by the direction operation.

According to another exemplary embodiment of the present invention, there may be provided an information processing apparatus that processes progress of a game involving moving a plurality of objects arranged on a game field. The information processing apparatus may include an accepting unit that may accept operation information regarding a touch operation performed by a user, from a certain input face capable of detecting the touch operation; an associating unit that may associate the plurality of objects as a group; a moving unit that may move, in a case where the operation information is a direction operation indicating a certain direction, the plurality of associated objects as a group in the direction indicated by the direction operation; and a display processing unit that may display the game field and the plurality of objects arranged on the game field on a screen of the game, and, in a case where a moving process is performed by the moving unit, may display the plurality of objects in accordance with the moving process. Upon acceptance of the direction operation as the operation information while a specifying operation that specifies a first object that is any of the plurality of objects is being accepted as the operation information, the moving unit may move the remaining objects, excluding the first object from the plurality of objects, as a group in the direction indicated by the direction operation.

According to the game program, the computer control method, and the information processing apparatus according to the exemplary embodiments of the present invention, in a game where a plurality of objects are collectively moved by one swipe operation, more advanced strategies can be used in collectively moving the plurality of objects, and hence a very strategic game can be provided.

BRIEF DESCRIPTION OF THE DRAWINGS

Exemplary

Exemplary FIG. 2 is a data conceptual diagram of an example unit arrangement information referred to by a game program.

Exemplary

Exemplary

Exemplary

Exemplary

Exemplary

Exemplary

Exemplary

Exemplary

Exemplary

Exemplary

Exemplary

Exemplary

Exemplary

Exemplary

Exemplary

Exemplary

DETAILED DESCRIPTION

Figure 1:
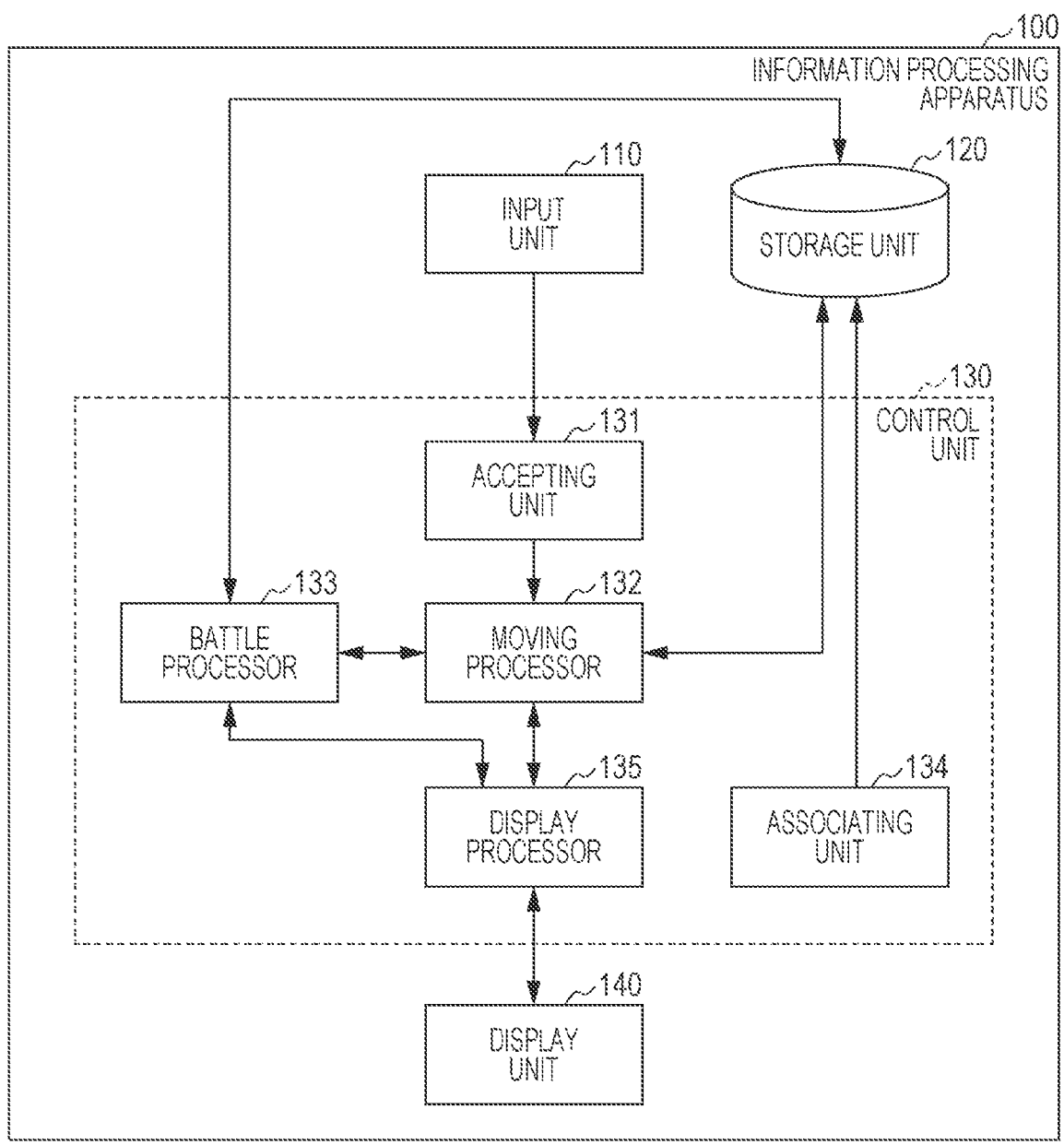
FIG. 1 is a functional block diagram of an exemplary embodiment of an information processing apparatus.

According to a first exemplary embodiment, an information processing apparatus (computer) may function as a mobile terminal (client apparatus), and a game program according to an embodiment of the present invention may be executed as a so-called native application (native game) by the mobile terminal. Such an exemplary embodiment may be described with reference to FIGS. 1 to 11B.

According to a second exemplary embodiment, an information processing apparatus (computer) may function as a server apparatus, the game program according to the embodiment of the present invention may be partially or entirely executed as a so-called web application (web game) by the server apparatus, and the execution result may be returned to the mobile terminal. Such an exemplary embodiment may be described with reference to FIG. 12.

A game program according to an exemplary embodiment of the present invention may be a game program that may process the progress of a game for moving a plurality of objects arranged on a game field, and may cause a computer to implement an accepting function, an associating function, a moving function, and a display processing function.

An accepting function may accept operation information regarding a touch operation performed by a user, from a certain input face capable of detecting the touch operation. For example, the touch operation may include the player of the game providing an input to a computer by bringing a finger or an indication tool (such as a stylus) into contact with or very close to the input face. In the case where the operation information indicates the coordinates of one point, the operation information may indicate the coordinates, and, in the case where the operation information indicates the coordinates of a plurality of points, the operation information may be information on a trajectory based on a start point (the first touched point) and an end point (a point at which no point is detectable any more after continuously detecting the touch). In the following description, an operation that specifies the coordinates of one point may be described as a touch operation, and an operation that indicates a trajectory that is substantially straight may be described as a swipe operation. A direction operation indicated by the swipe operation may refer to a direction from the start point to the end point.

The associating function may associate the plurality of objects as a group. In the case of associating a plurality of objects, the associating function may associate objects included in a certain range, may associate objects with a certain positional relationship (such as an in-line positional relationship), or, in the case where enemies appear in the game, may associate all objects that operate on the same player side or team, excluding enemies. As an associating technique, for example, a plurality of objects may be collectively stored as one group, a plurality of objects may be associated with each other, or one of a plurality of objects may be associated with all of the remaining objects.

In addition, an object may be, for example, any given electronic data (such as a character, an item, a card, or a building that can be moved by the user as a resource in the game) used by the user in a game implemented by the above-described game program or another game. In the following description, objects are described as user characters $300a$ to $300j$.

The moving function may move, upon acceptance of a direction operation as operation information while a specifying operation that specifies a first object that is any of a plurality of objects is being accepted as operation information, any remaining objects, excluding the first object from the plurality of objects, as a group in a direction indicated by the direction operation.

Figure 6A:
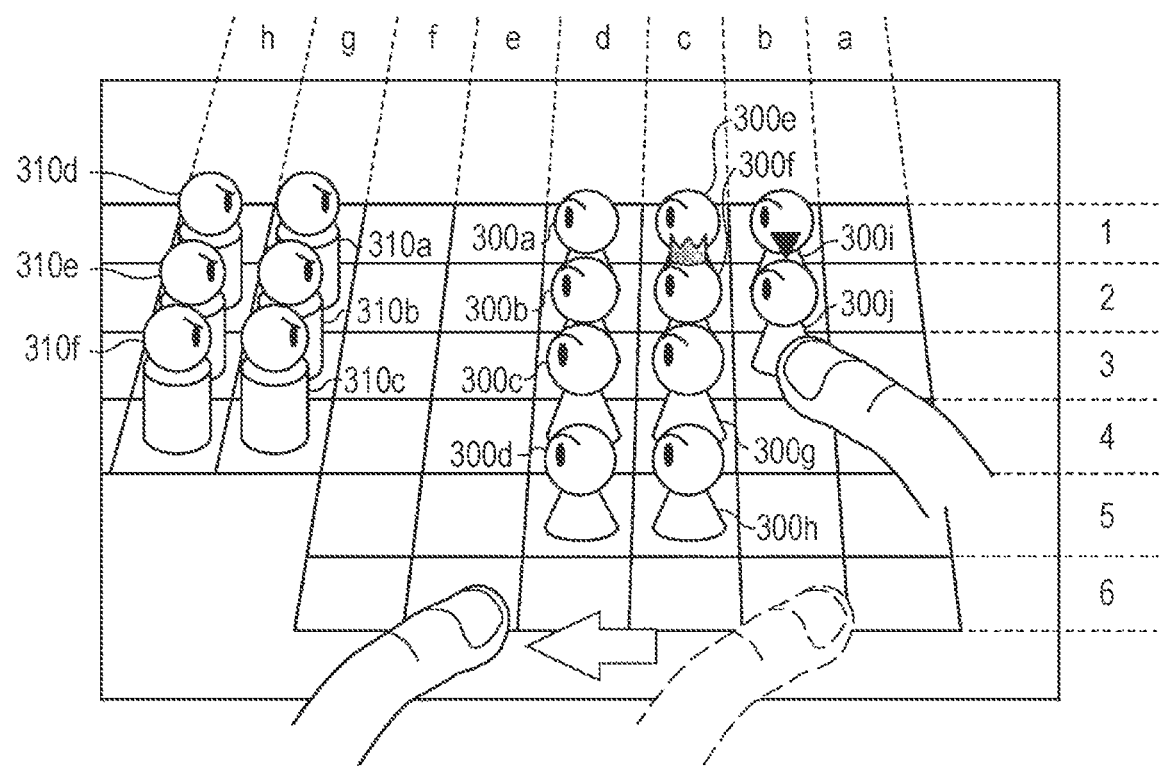
FIG. 6A is a screen diagram illustrating an example of the movement of the unit group while one unit is being fixed.
Figure 6B:
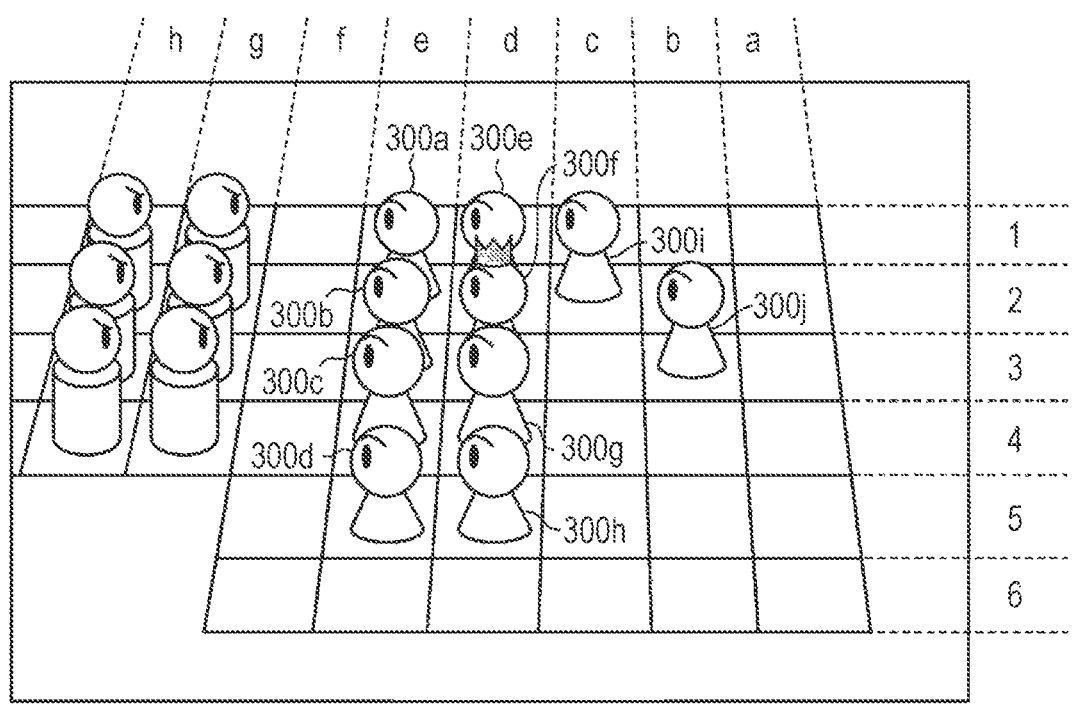
FIG. 6B is a screen diagram illustrating an example of the movement of the unit group while one unit is being fixed.

"The first object" described above may correspond to, for example, the user unit $300j$ in FIGS. 6A and 6B. As depicted in FIGS. 6A and 6B, a user has excluded the user unit $300j$ from the plurality of objects in FIG. 6A, and as a result the user unit $300j$ has not moved in FIG. 6B despite all of the surrounding units moving. The remaining objects may correspond to the user units 300a to 300i in the case of FIGS. 6A and 6B.

On the game field, a no-move area or an obstacle object into which an object is incapable of progressing may be set. In movement by a moving process, in the case where a second object that is any of the remaining objects is prevented from moving by a no-move area or an obstacle object, the moving function may not move the second object, and may keep the second object as it is at the same position on the game field as the position at which the direction operation has been accepted.

A no-move area may refer to an area into which an object cannot move in the game field. In the following description, the game field where a game medium moves may be configured in the shape of a grid of cells (for example, see FIG. 2), and among these cells, cells 5g, 6g, 5h, and 6h may correspond to no-move areas. Using FIG. 2, for example, the cell 5g refers to the cell at the fifth column, g-th row. In the following description, obstacle objects may correspond to rocks, blocks, walls, and puddles in a first modification.

Figure 7A:
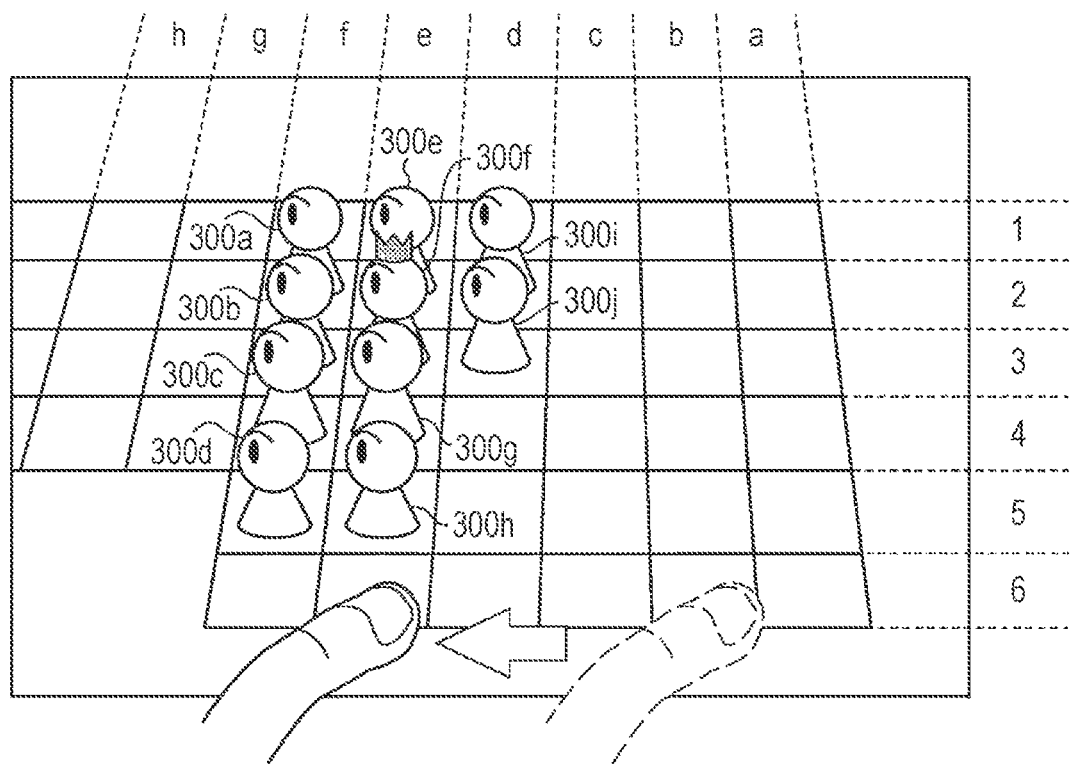
FIG. 7A is a screen diagram illustrating an example of movement in the case where one unit of the unit group collides with a boundary.
Figure 7B:
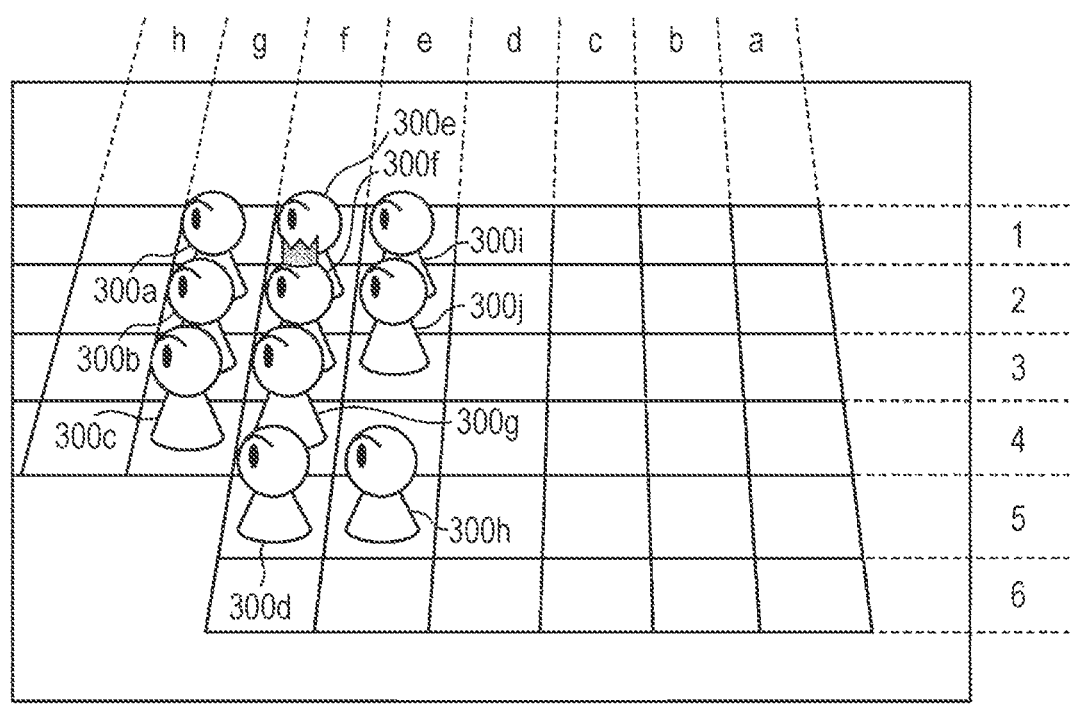
FIG. 7B is a screen diagram illustrating an example of movement in the case where one unit of the unit group collides with a boundary.
Figure 8A:
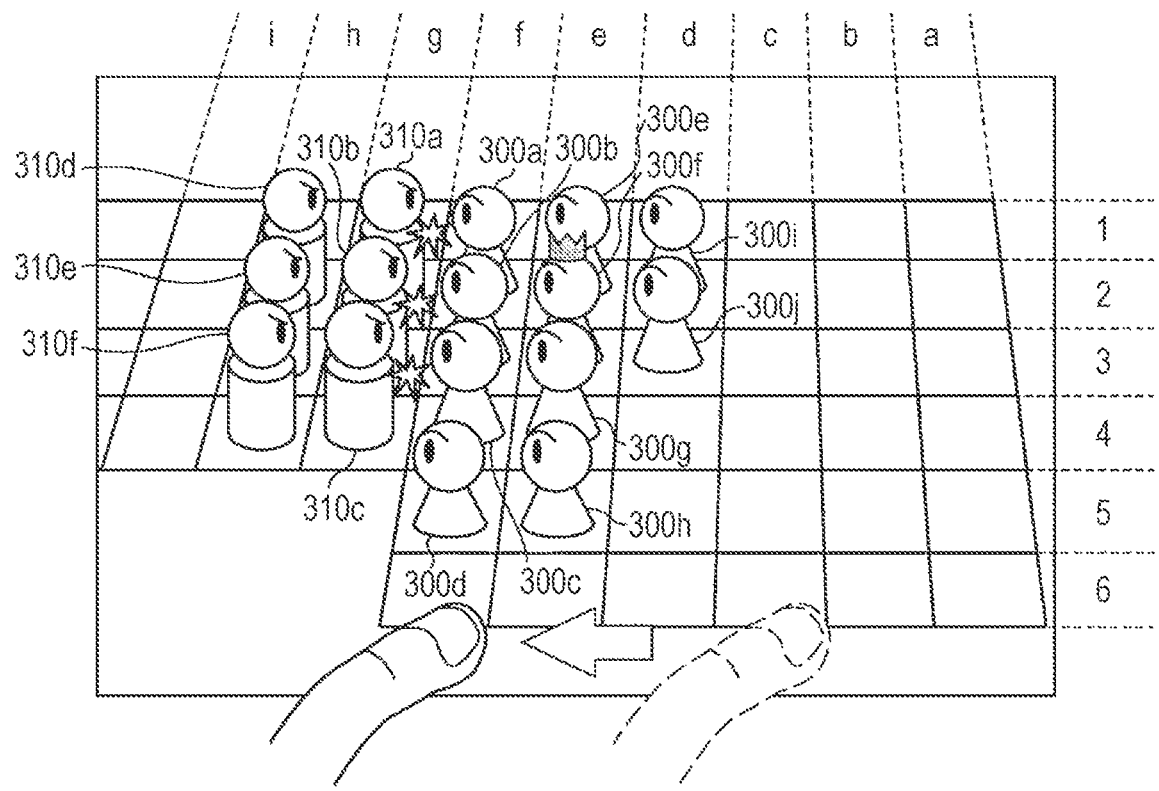
FIG. 8A is a screen diagram illustrating an example of movement in the case where the unit group collides with enemies.
Figure 8B:
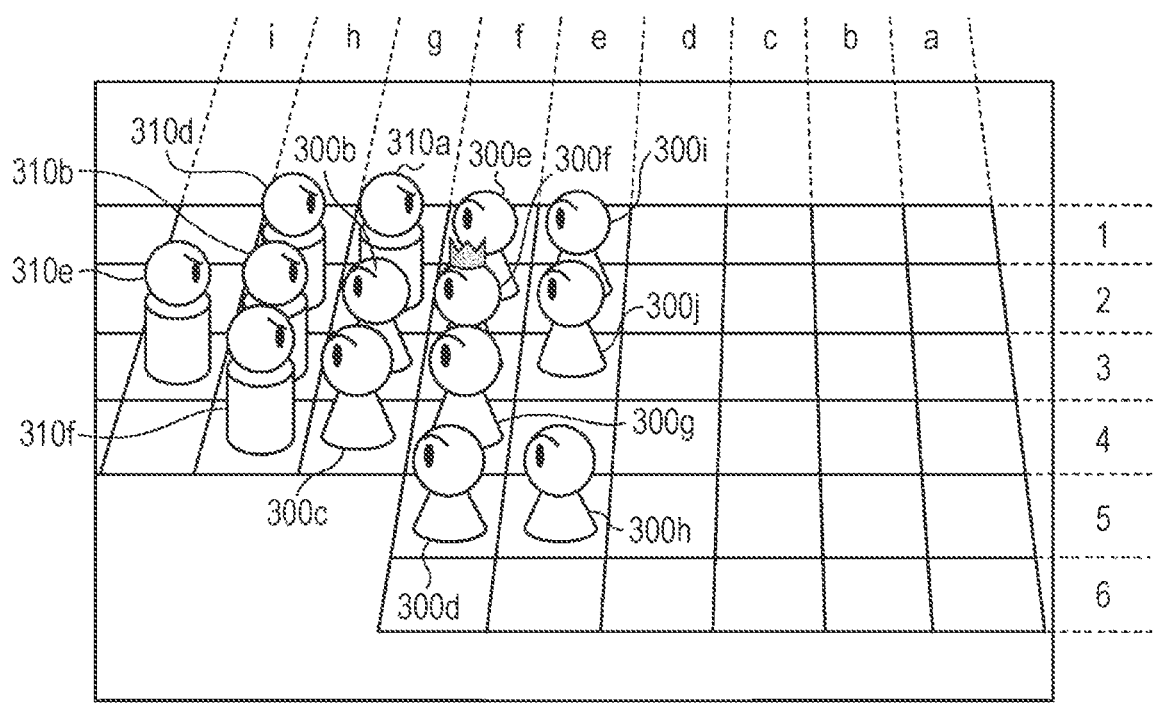
FIG. 8B is a screen diagram illustrating an example of movement in the case where the unit group collides with enemies.

"The second object" described above may correspond to, for example, the user unit 300d in FIGS. 7A and 7B or the user unit 300d in FIGS. 8A and 8B. As depicted in FIGS. 7A and 7B, because of the presence of a no-move object in front of the user unit 300d in FIG. 7A, user unit 300d is not moved along with the remainder of the units as depicted in FIG. 7B.

In the game program, in the case that a second object is not moved in a direction indicated by the direction operation, and in the case where there is a remaining object other than the second object on a straight line in the direction indicated by the direction operation, the moving function may not move either the second object or the remaining object.

"The remaining object" described above may correspond to, for example, the user unit 300h in FIGS. 7A and 7B, and to the user unit 300h in FIGS. 8A and 8B. As depicted in those figures, user unit 300h is on a straight line with the second object 300d in the direction of the direction operation. As such, when user unit 300d is not moved along with the remainder of the units as depicted in FIG. 7B, remaining object 300h is likewise not moved along with the remainder of the units.

In the case where each of the plurality of objects has a direction, the game program may further cause the computer to implement, upon acceptance of a direction operation as operation information while a specifying operation that specifies a portion other than the plurality of objects is being accepted as operation information, a direction changing function that may change the direction of each of the plurality of objects to a direction indicated by the direction operation.

The direction changing function may be any function as long as it changes the direction of an object on the basis of a user operation. In the following description, the direction changing function is described as a fifth modification.

An exemplary embodiment of the game program may be implemented by at least three configurations described below. That is, the game program may be implemented by (a) a configuration in which a computer functions as a client apparatus (such as a smart phone or a personal computer), and the game program is executed by the client apparatus, (b) a configuration in which the computer functions as a server apparatus (such as a main frame, a cluster computer, or any given computer capable of providing a game service to an external device), the game program is partially or entirely executed by the server apparatus, and the execution result is returned to the client apparatus, or (c) a configuration in which processes included in the game program are arbitrarily shared by the client apparatus and the server apparatus.

Therefore, an exemplary embodiment of the display function implemented by the game program (a) may display the game screen on an external display device (such as a display unit included in a mobile terminal) connected to the computer via a certain network (such as the Internet) so as to be able to communicate with the computer, by outputting information (such as display information) to the display device, or (b) may display the game screen on a display device included in the computer by outputting the display information to the display device.

In addition, according to an exemplary embodiment, the game program may be implemented by (a) a configuration in which a client apparatus connected to the computer via a certain network (such as the Internet) so as to be able to communicate with the computer includes a certain input device, the client apparatus transmits the operation information input via the certain input device to the computer, and an operation information obtaining function implemented by the game program on the computer obtains the operation information, or (b) a configuration in which the computer includes the certain input device, and the operation information obtaining function obtains the operation information via the certain input device.

A game according to a first exemplary embodiment may be intended to cause, in an object group operated by a user (hereinafter referred to as a user unit group), any object (in the first embodiment, the user unit 300f set as a leader of the user unit group) included in the user unit group to arrive at a goal arranged somewhere on a game field (hereinafter referred to as a map) set in the form of a grid of cells, from an initial arrangement position. This grid may be configured such that only up to one unit may be arranged in each cell of the grid. In the game, the user may be required to cause the user unit 300f to arrive at the goal within a certain number of turns (a certain number of operations) or a certain time while defeating or escaping objects serving as enemies (obstacles) (hereinafter referred to as enemy units).

According to an exemplary embodiment of the game, one swipe operation performed by the user on a touchscreen moves the user unit group as a whole by one cell in a direction indicated by the swipe operation.

According to such an embodiment, when the user performs a swipe operation while performing a touch operation that specifies a user unit of the unit group, the game may fix the user unit specified by the touch operation as it is (that is, the game may not move the specified user unit), and may collectively move the remaining user units of the user unit group by one cell in a direction indicated by the swipe operation.

Accordingly, the game according to the first embodiment can provide a more strategic game because of the unit group movement.

An exemplary embodiment of an information processing apparatus 100 may also be described with reference to the drawings.

Exemplary FIG. 1 is a block diagram illustrating an example of the main configuration of the information processing apparatus 100. The information processing apparatus (computer) 100 may be an information processing apparatus capable of executing a game program including processes described hereinafter. The information processing apparatus 100 may be, as a specific device, for example, a smart phone, a tablet terminal, a home video game console, a mobile phone, a personal computer, or other electronic devices as long as this device can execute the processes. Note that the game program may be suitably executed by a multifunction device (such as a smart phone) that includes a display (display unit), an input face capable of detecting a touch input, a memory, and one or a plurality of processors capable of executing one or a plurality of programs stored in the memory.

As illustrated in FIG. 1, the information processing apparatus 100 may include an input unit 110, a storage unit 120, a control unit 130, and a display unit 140.

According to an exemplary embodiment, the input unit 110 may have an input face capable of detecting a touch input, and may have the function of accepting an input from the user and transferring the accepted input details to the control unit 130. The input unit 110 may be implemented by, for example, a touch pad included in a mobile terminal. In this case, the input unit 110 may transfer input coordinate information on a point touched by the user on the touchscreen, or, in the case of a swipe operation, may transfer trajectory information of the swipe operation. A swipe operation is an operation of sliding a finger touching on the input face. According to an exemplary embodiment, a swipe operation may be used to identify a direction of moving each user unit. A swipe operation can be regarded as a type of touch operation, that is, a set of touch operations, in which the first touched portion (start point) and a portion where this touching is released (end point) are detected, and a direction from the start point to the end point is identified as a direction that the user wants to specify. For example, when the user slides a finger from right to left on the input face, this swipe operation may indicate movement of each user unit in a leftward direction on the screen. For example, when the user slides a finger from top to bottom on the input face, this swipe operation may indicate movement of each user unit in a downward direction on the screen.

The input face of the input unit 110 may correspond to a display screen of the display unit 140, and the input coordinate system of the input unit 110 and the coordinate system of the display screen of the display unit 140 may have a corresponding relationship. That is, for example, the user's touching an object displayed on a game screen displayed on the display unit 140 may execute an operation on this object.

According to an exemplary embodiment, the storage unit 120 may have the function of storing the game program and various types of data necessary for executing the game program. The storage unit 120 may be implemented by various recording media, such as typically a hard disk drive (HDD), a solid state drive (SSD), or a flash memory.

The storage unit 120 may retain map information 200 used by the game program. The map information 200 may include information indicating the state of the map, and each unit's arrangement position. The map information 200 will be described in detail later. The storage unit 120 may also retain group information (not illustrated) regarding the user unit group to be collectively moved, and the group information may include the identifiers of user units of the user unit group. In response to detection of a swipe operation performed by the user, each unit included in the group information may progress one cell in a direction indicated by the swipe operation, as long as its progression is not hindered.

The storage unit 120 also stores parameters of each of user units and each of enemy units used in the game (such as a hit point (HP) indicating the physical strength, usable special capabilities (such as magical ability, skills, etc.), offensive ability, defensive ability, and speed).

According to an exemplary embodiment, the control unit 130 may be a processor with the function of executing the progress of the game. Upon acceptance of an instruction to start the game, the control unit 130 may display a game screen on the display unit 140, and may cause the game to progress in accordance with a user input from the input unit 110. The control unit 130 may provide a stage where the user plays, and, in the case where the user succeeds in causing a user unit to arrive at a set goal, the control unit 130 may prepare the next stage. The shape of the map, the position at which each enemy unit is arranged, and enemy units to be arranged may all be different from one stage to another.

The control unit 130 may also include an accepting unit 131, a moving processor 132, a battle processor 133, an associating unit 134, and a display processor 135.

According to an exemplary embodiment, the moving processor 132 may have the function of executing a process of moving the user unit group in accordance with an input from the input unit 110, and executing a process of moving enemy units in accordance with a predetermined algorithm. In the case where a touch input is transferred from the input unit 110, the moving processor 132 may identify the position where the touch operation has been input, and may identify a user unit displayed in accordance with that input position. In addition, in the case where a swipe input is input from the input unit 110, the moving processor 132 may identify the start point and the end point of the swipe input on the game screen, and may determine a direction from the start point to the end point as a direction of moving each user unit.

Regarding the process of moving each user unit, the moving processor 132 may be configured to execute two types of moving processes. That is, these are the following two types.

(1) In the case where a swipe operation is transferred from the input unit 110, the moving processor 132 may collectively move the user unit group by one cell in a direction indicated by the swipe operation.

(2) In the case where a swipe operation is transferred from the input unit 110 and additionally detection of a touch operation has been transferred from the input unit 110, the moving processor 132 may fix (does not move) a user unit specified by the touch operation, and may collectively move the remaining user unit group in a direction indicated by the swipe operation.

In execution of these two types of moving processes, the moving processor 132 may determine whether each user unit of the user unit group can move, and, if that user unit can move, may determine that user unit's destination, and may collectively move user units of the user unit group that can move. If a certain unit cannot move, this may be for several reasons: that user unit may have been specified by the user, as indicated in the above-described moving process (2); the unit's planned destination may be a no-move area; and that user unit may be fixed at a planned destination. Hereinafter, the case in which a planned destination is not a no-move area and there is no user unit fixed at that planned destination will be represented as the fact that the planned destination is empty.

According to an exemplary embodiment in which a user unit group may be moved in a direction indicated by a swipe operation, the moving processor 132 may determine the planned destination of a user unit at the front and so on, and, when the planned destinations of all user units are determined (including the case of not moving), the moving processor 132 may collectively move user units that are not fixed. Here, if there is a plurality of user units at the front in the case of moving in a direction indicated by a swipe operation, the moving processor 132 may sequentially determine the planned destinations of these user units at the front (in a randomly selected order or in an order in accordance with a certain criterion).

According to an exemplary embodiment, where there is an enemy unit in a cell at the planned destination of a user unit, the moving processor 132 may transfer a combination of the identifier of the user unit and the identifier of the enemy unit, for which a battle (fighting) is to be executed, to the battle processor 133, and may request the battle processor 133 to perform a battle process. Once the battle process has been completed, the moving processor 132 may receive a notification of a battle process end from the battle processor 133. In the case where the notification includes information on the enemy unit, the moving processor 132 may move that enemy unit one cell back in a direction indicated by the swipe operation. If there is a second enemy unit arranged in a direction of moving the aforementioned enemy unit back, the moving processor 132 may also move the second enemy unit back.

Next, in order to move user units, the moving processor 132 may determine the destination of a user unit at the front and so on in a direction indicated by the swipe operation. If there is a plurality of user units positioned at the front, the moving processor 132 may select one of these user units at a time and may determine the destination of that user unit. At this time, if the destination is a no-move area, the user unit to be moved to that no-move cell may be fixed (not moved) at the current position prior to the movement. In addition, if there is a user unit that is to be moved to a cell where there is a fixed user unit (a user unit specified by a touch operation performed by the user, and a user unit to be moved to a no-move cell), the user unit to be moved may be fixed.

After the battle process is finished and user unit(s) are fixed, the moving processor 132 may collectively move movable user units of the user unit group, that is, unfixed user units, by one cell in a direction indicated by the swipe operation. After this movement, the fixing of the fixed user unit(s) may be released.

Although the movement of the user units has been described in detail here, enemy units may also move in accordance with a predetermined algorithm, like the user units.

The moving processor 132 may transfer the movement result of the moving process to the display processor 135.

According to an exemplary embodiment, in the case where there is an enemy unit in a cell at the destination of a user unit or in the case where there is a user unit in a cell at the destination of an enemy unit as a result of movement performed by the moving processor 132, the battle processor 133 may have the function of executing a battle process between the user unit and the enemy unit. In response to a request from the moving processor 132, the battle processor 133 may execute a battle process between units that are included in a notification.

Parameters (such as HP (physical strength), offensive ability, and defensive ability) may be set for each of the user unit(s) and the enemy unit(s), and the battle processor 133 may execute a process regarding a battle in accordance with a predetermined battle algorithm. In the case where the user unit loses in the battle process, information identifying the defeated user unit may be deleted from the later-described map information 200; and, in the case where the user unit wins in the battle process, information identifying the defeated enemy unit may be deleted from the map information 200. The battle processor 133 may be configured to regard the case where, as a result of the battle process, the HP of the user unit is greater than zero and the HP of the enemy unit is zero as the user unit's victory, and the case in which the HP of the user unit is zero and the HP of the enemy unit is greater than zero as the user unit's defeat. In addition, the battle processor 133 may regard the case in which, as a result of the battle process, the HPs of both the user unit and the enemy unit are not zero (that is, both of the units have remaining HPs) as a draw. Note that the battle processor 133 may display on the screen an effect indicating victory, defeat, or the like of the battle.

The battle processor 133 may transfer a notification of the battle process end (including information on the enemy unit with which the user unit has tied) to the moving processor 132, and may transfer display data regarding the battle to the display processor 135.

According to an exemplary embodiment, the associating unit 134 may have the function of associating a user unit group that moves in a group as a group, and storing the group in the storage unit 120. In the first embodiment, the associating unit 134 may associate the user units 300*a* to 300*j* as a group.

According to an exemplary embodiment, the display processor 135 may generate display data in accordance with the movement result transferred from the moving processor 132 and the battle result transferred from the battle processor 133, and may write the display data in a frame memory of the display unit 140.

The display unit 140 may be a monitor that has the function of accepting an instruction from the control unit 130 and displaying an image.

According to an exemplary embodiment, the input unit 110 and the display unit 140 may be implemented by a touchscreen including the input unit 110 and the display unit 140 superimposed on each other.

Turning now to exemplary FIG. 2, FIG. 2 displays an example of a data conceptual diagram of the map information 200 to which the game program refers, which may also be information indicating the arrangement position of each unit.

According to an exemplary embodiment, the map information 200 may correspond to a game field configured in the form of a grid of cells on a game screen. That is, each cell indicated by each row and each column of the map information 200 may correspond to the state of each cell displayed as a game field. The state of each cell may refer to information associated with a cell, such as whether a unit is arranged in that cell, whether that cell is a cell into which a unit can move, or whether another object is arranged in that cell.

In each cell in the map information 200, if a unit is arranged in that cell, an identifier unique to that unit may be associated with that cell. In addition, if a cell is not on the map, or if the cell is otherwise a cell into which a unit cannot move, information indicating that that cell is a no-move cell may be associated with that cell. In FIG. 2, the symbol "×" may be used as information indicating a no-move cell. Although not illustrated in FIG. 2, the term "goal" may be indicated in a cell serving as a set goal in the map information 200.

As illustrated in FIG. 2, for example, the user unit "300*i*" may be arranged in the cell "2*b*", and the enemy unit "310*b*" may be arranged in the cell "3*g*". In addition, as depicted in exemplary FIG. 2, the cell "5*g*" may be a no-move cell.

According to an exemplary embodiment, the control unit 130 may make use of the map information 200 in order to manage each unit and its movement.

Figure 3:
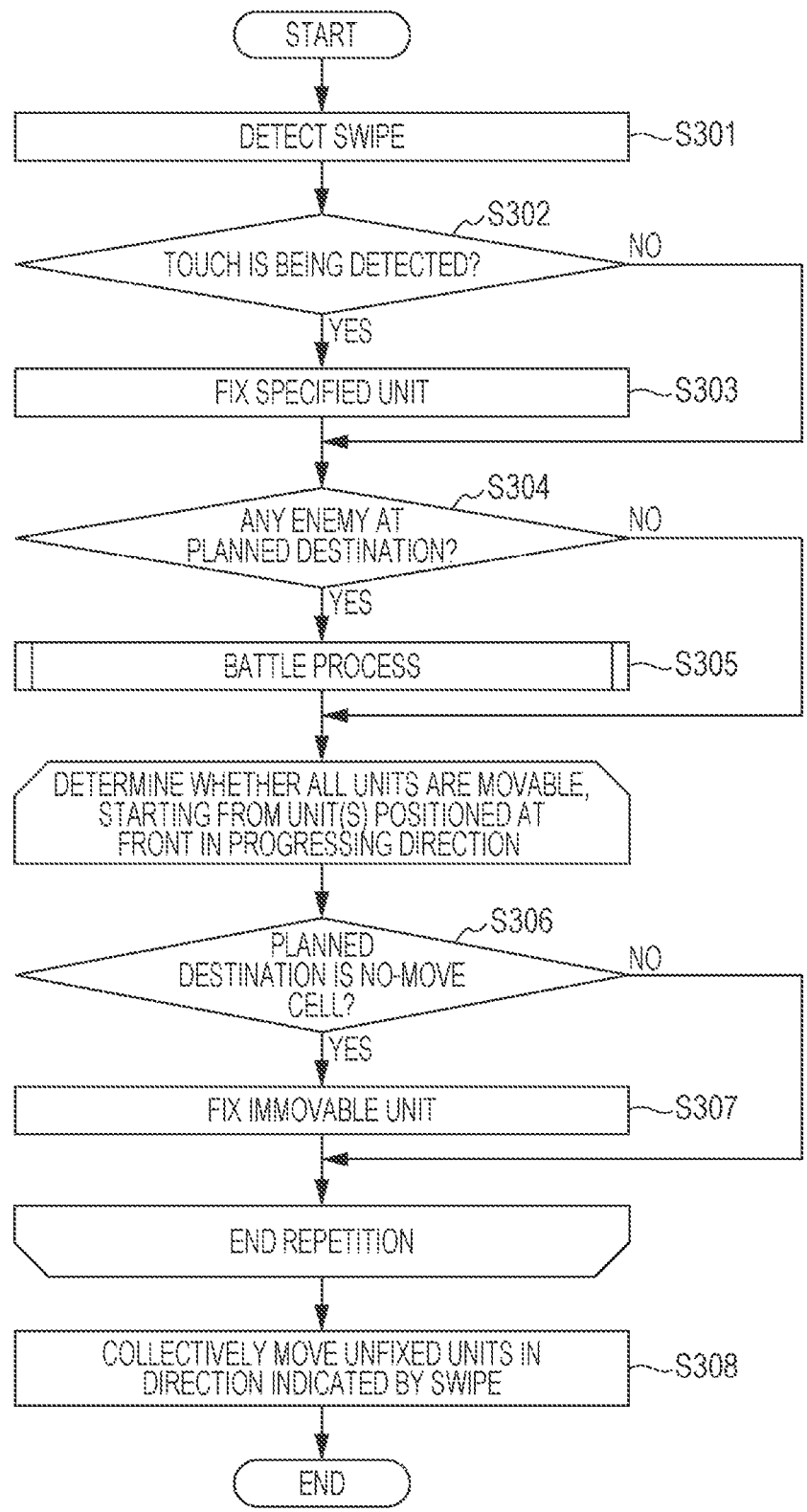
FIG. 3 is a flowchart illustrating an exemplary embodiment of the operation of the information processing apparatus.

Turning now to exemplary FIG. 3, FIG. 3 depicts a flowchart illustrating an example of the operation of the information processing apparatus 100. According to an exemplary embodiment, a process of moving the user unit group in response to an input from the user may be described. Descriptions of the other game elements may be omitted since the specification of a game in the related art is applicable to these other game elements.

The input unit 110 of the information processing apparatus 100 may detect a swipe operation performed by the user, and may transfer the detection of the swipe operation to the control unit 130 (step S301).

At this time, in the case where the input unit 110 is detecting a touch operation performed by the user (YES in step S302), the input unit 110 may transfer the detection of the touch operation to the control unit 130 successively (such as every second). In response to the transfer of the detection of the user's touch operation, the moving processor 132 may fix (does not move) a user unit associated with the coordinates where the touch operation has been performed (step S303).

In response to a swipe operation, if no touch operation is being detected (NO in step S302), the operation may proceed to step S304.

For the user unit group, the moving processor 132 may determine whether there is a user unit whose planned destination is a cell where an enemy unit is arranged (step S304). The moving processor 132 may perform this determination using the map information 200.

In the case where there is a user unit whose planned destination has an enemy unit arranged therein (YES in step S304), the moving processor 132 may transfer information on a combination of the user unit and the enemy unit who are in conflict with each other to the battle processor 133, and may request the battle processor 133 to perform a battle process (step S305).

The battle processor 133 may execute a battle process between the user unit and the enemy unit included in the transferred information. The battle processor 133 may execute a battle process in accordance with a certain battle algorithm on the basis of the parameters of the user unit and the parameters of the enemy unit included in the transferred information (step S305). If the result of the battle process is that there is a defeated unit, the battle processor 133 may delete that unit from the map information 200, and may notify the moving processor 132 of the fact that the battle process has ended, along with the result of the battle process. If there is an enemy unit with which the user unit has tied, the moving processor 132 may move that enemy unit back by one cell in a direction indicated by the swipe operation.

According to an exemplary embodiment, the moving processor 132 may determine whether to move each user unit.

If it is assumed that a direction indicated by the swipe operation is a direction in which the user unit group progresses, the moving processor 132 may sequentially determine whether each user unit is movable, starting from a user unit positioned at the front.

According to an exemplary embodiment, in order for the moving processor 132 to determine whether or not a unit is able to move, the moving processor 132 may determine whether the user unit is immovable to a cell at its planned destination (step S306). The moving processor 132 may determine whether a user unit is immovable to its planned destination by determining whether the planned destination is set as a no-move area in the map information 200 or whether there is a user unit fixed at the planned destination.

In the case where a user unit is immovable to its planned destination (YES in step S306), the moving processor 132 may fix (does not move) the user unit (step S307), and may determine whether the next user unit is movable. In the case where the user unit is not immovable to its movement destination, the moving processor 132 may determine whether the next user unit is movable.

After determining whether all the user units are immovable to their planned destinations, the moving processor 132 may collectively move unfixed user units by one cell in a direction indicated by the swipe operation (S308).

The process indicated in FIG. 3 may be repeated, in order to make the user unit 300*f* with a crown arrive at a goal. When the user unit 300*f* with a crown arrives at a goal set in one of the cells on the map, this may mean that the user has cleared the map, and a new map may be made available to the user to challenge.

Hereinafter, a specific example of the movement of user units using display examples will be described.

Figure 4:
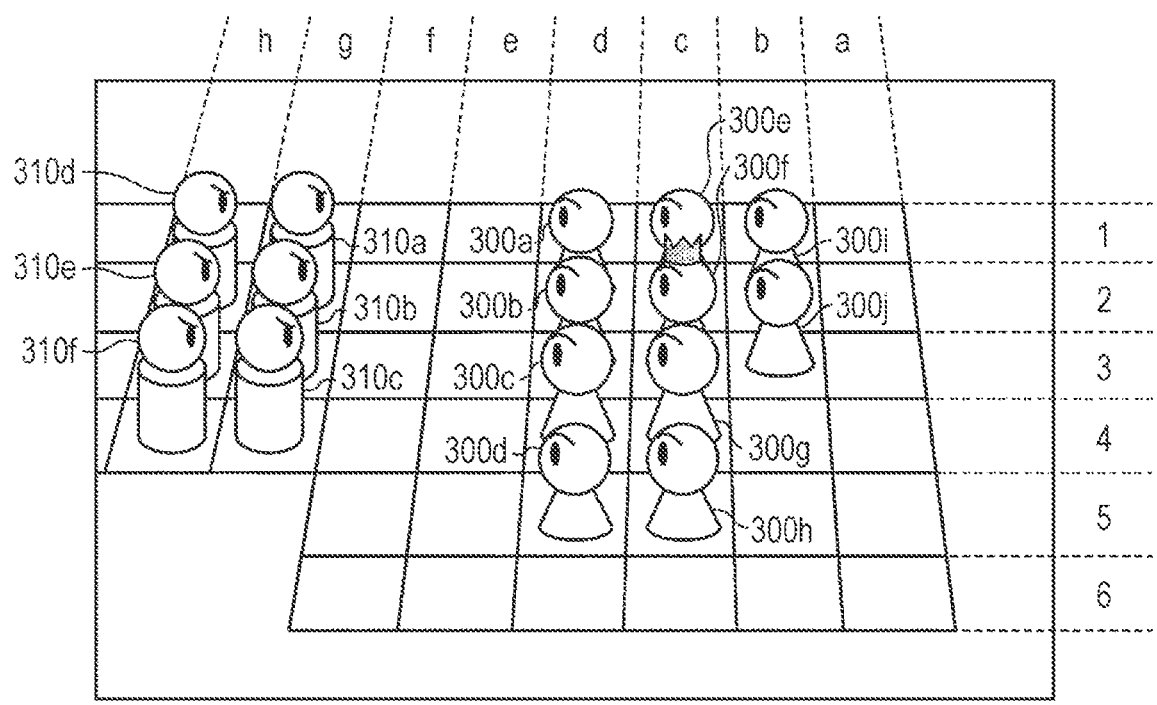
FIG. 4 is a screen diagram illustrating an exemplary basic screen.

Exemplary FIG. 4 depicts a diagram illustrating one display example of a game screen.

In accordance with an instruction from the display processor 135 included in the control unit 130, the display unit 140 may display a game screen such as that illustrated in FIG. 4. The display unit 140 may display a game screen on which the map with the shape indicated by the map information 200 is displayed in three dimensions, and the user units 300*a* to 300*i* and the enemy units 310*a* to 310*f* are arranged at positions indicated by the map information 200 and displayed in three dimensions. The user may operate the user units 300*a* to 300*i* of the user unit group, and may cause the user unit 300*f* with a crown to arrive at a goal. According to an exemplary embodiment, it may be assumed that only one unit can be arranged in one cell.

Figure 5A:
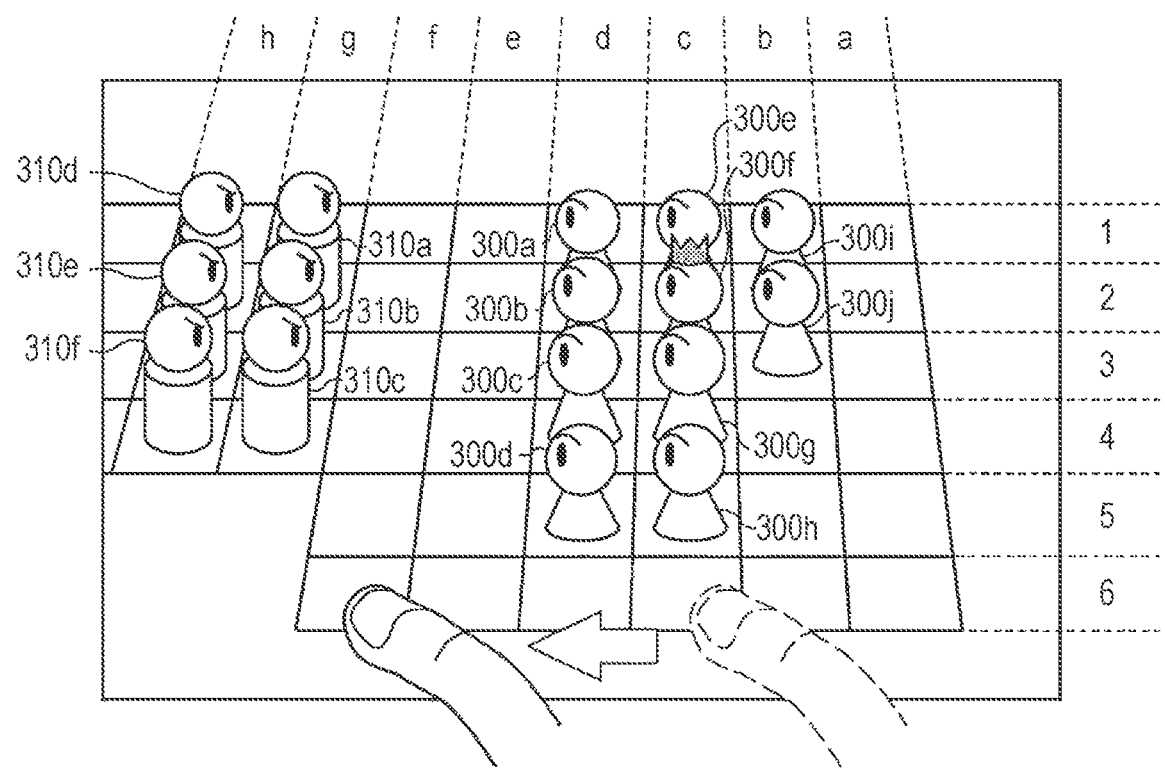
FIG. 5A is a screen diagram illustrating an example of the basic operation and movement of a unit group.
Figure 5B:
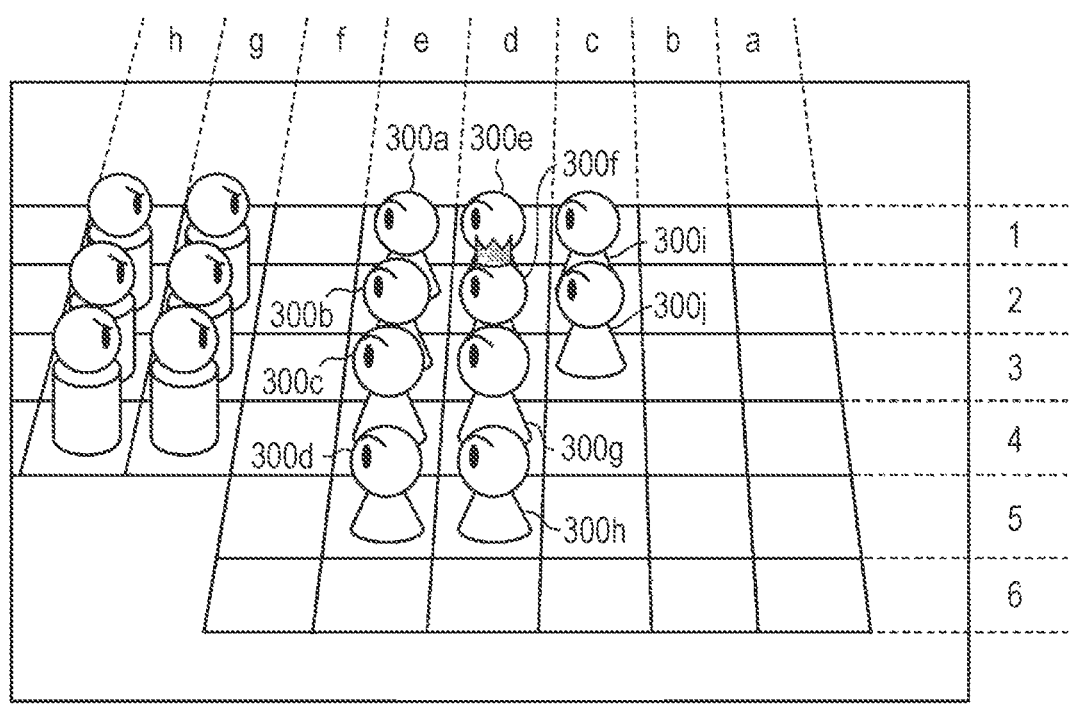
FIG. 5B is a screen diagram illustrating an example of the basic operation and movement of a unit group.

Turning now to exemplary FIGS. 5A and 5B, FIGS. 5A and 5B depict diagrams illustrating a specific example of the movement of user units in the case where the user performs a swipe operation on the screen, that is, on the input unit 110.

According to the exemplary embodiment of the screen of the information processing apparatus 100 in a display state that is displayed in FIG. 4, a set of units may initially be at rest. Then, as displayed in FIG. 5A, a user may perform a swipe operation of sliding a finger from right to left.

According to this embodiment, the moving processor 132 may collectively move the user units 300*a* to 300*j* of the user unit group leftward on the screen as depicted in FIG. 5B.

Specifically, the moving processor 132 may determine each user unit's destination, starting from a user unit(s) positioned at the front in a direction of movement indicated by the swipe operation, and may collectively move the user unit group. Regarding a user unit(s) positioned at the front in the user unit group, since the swipe operation is performed from right to left in the case of FIG. 5A and indicates a leftward direction, the user units 300*a*, 300*b*, 300*c*, and 300*d* may be user units positioned at the front. The moving processor 132 may first determine the planned destinations of these user units 300*a* to 300*d*.

According to this exemplary embodiment, since the planned destination e1 of the user unit 300*a* is empty, the moving processor 132 may not fix the user unit 300*a*. Similarly, since the planned destinations 2e to 4e of the user units 300*b* to 300*d* are empty, the moving processor 132 may not fix the user units 300*b* to 300*d*. Although the user unit 300*a* is arranged at the planned destination of the user unit 300*e*, the user unit 300*a* is not fixed and is movable, that is, the planned destination 2d is empty. Therefore, the moving processor 132 may not fix the user unit 300*e*. Similarly, since the planned destinations 2*d*, 3*d*, and 4*d* of the user units 300*f* to 300*h* are empty, the moving processor 132 may not fix the user units 300*f* to 300*h*. Similarly, since the planned destinations 2*c* and 3*c* of the user units 300*i* and 300*j* are empty, the moving processor 132 may not fix the user units 300*i* and 300*j*. Therefore, the moving processor 132 may not fix all the user units, and may collectively move all the user units 300*a* to 300*j* by one cell in a direction indicated by the swipe operation, in this case leftward on the screen.

As a result, as illustrated in exemplary FIG. 5B, each user unit may move to the left by one cell. This operation so far is a basic operation of moving the user unit group. As a result of one swipe operation, the user units 300*a* to 300*j* may be collectively moved in a direction indicated by the swipe operation.

FIGS. 6A and 6B are diagrams illustrating a specific example of the movement of the user unit group in the case where the user performs a swipe operation while performing a touch operation that specifies a particular user unit.

As illustrated in exemplary FIG. 6A, a user may execute a swipe operation of sliding a finger from right to left, while touching the user unit 300*j*.

In response to this, as illustrated in FIG. 6B, the user unit 300*j* touched by the user may be fixed at its position, and the remaining user units 300*a* to 300*i* may move to the left by one cell.

For example, the moving processor 132 may fix a user unit 300*j* that is specified by a touch operation, so as not to cause it to move. According to the exemplary embodiment displayed in FIG. 6A, the specified user unit may be indicated by a cursor in order to clearly show that the user unit has been specified; however, this is not essential. Next, since the planned destination 2*e* of the user unit 300*a* is empty, the moving processor 132 may not fix the user unit 300*a* as may have happened if the planned destination 2*e* of the user unit 300*a* was occupied. Similarly, since the planned destinations 3*e*, 4*e*, and 5*e* of the user units 300*b* to 300*d* are empty, the moving processor 132 may not fix the user units 300*b* to 300*d*. Since the planned destination 2*d* of the user unit 300*e* is empty, the moving processor 132 may not fix the user unit 300*e*. Similarly, since the planned destinations 3*d*, 4*d*, 5*d*, and 2*c* of the user units 300*f* to 300*i* are empty, the moving processor 132 may not fix the user units 300*f* to 300*i*. The user unit 300*j* has already been fixed. Therefore, the moving processor 132 may not fix the user units 300*a* to 300*i* except for the user unit 300*j*, and may collectively move all the user units 300*a* to 300*i* except for the user unit 300*j* by one cell in a direction (leftward on the screen) indicated by the swipe operation.

By incorporating this movement operation, while one or some of the user units are being left as they are (not moved), the remaining user units can be collectively moved, thereby implementing a more strategic movement operation. By not moving one or some of the user units in accordance with the user's selection operation and by moving the remaining user units, the formation of the user units can be transformed to the user's desired shape. Since it is necessary to leave as many user units as possible in order to arrive at a goal, it is necessary for the user to appropriately transform the formation while taking into consideration enemy units and obstacles provided on the map. Accordingly, the game may become a more strategic game.

Turning now to exemplary FIGS. 7A and 7B, FIGS. 7A and 7B depict diagrams illustrating an example of the movement of the user unit group in the case where there is a user unit that is trying to move to a no-move cell.

According to the exemplary embodiment shown in FIG. 7A, it is assumed that the user units 300*a* to 300*j* of the user unit group are arranged on the map. As illustrated in FIG. 7A, there may be no cell to the left of the user unit 300*d* at the left side of the screen, which may make the user unit 300*d* immovable.

According to an exemplary embodiment, in such an arrangement state, the user may perform a swipe operation of sliding a finger from right to left, as illustrated in FIG. 7A.

According to this exemplary embodiment, in response to this swipe operation, the user unit 300*d* may not be able to move since the leftward direction, that is, the planned destination 5*g*, is a no-move area. Therefore, the user unit 300*d* may be fixed to the current position (cell 5*f*). That is, the user unit 300*d* may not be moved.

According to an exemplary embodiment where the user unit 300*d* has been fixed, the user unit 300*d* may be fixed and arranged at the planned destination 5*f* of the user unit 300*h*. Therefore, according to this exemplary embodiment, the planned destination 5*f* of the user unit 300*h* may not be empty and the user unit 300*h* cannot be moved either; thus, the user unit 300*h* may be fixed as well.

Therefore, as a result of a swipe operation performed in the arrangement state illustrated in FIG. 7A, the user units 300*a*, 300*b*, 300*c*, 300*e*, 300*f*, 300*g*, 300*i*, and 300*j* may collectively move to the left by one cell, as illustrated in FIG. 7B. In contrast, the two cells, namely, the user unit 300*d* whose destination is a no-move area, and the user unit 300*h* whose destination is occupied by the user unit 300*d*, may not move, and may remain at their current positions. That is, the user units 300*d* and 300*h*, which are arranged in the cell 5*f* and the cell 5*e*, respectively, as illustrated in FIG. 7A, may remain in the cell 5*f* and the cell 5*e*, respectively, after the user performs a swipe operation to the left. Since, according to an exemplary embodiment, it may be necessary to leave as many user units as possible in order to arrive at a goal, it may be necessary for the user to appropriately transform the formation while taking into consideration the shape of the map.

According to an exemplary embodiment, there may be a case where there is an enemy unit at a user unit's destination. Movement in that case may be described using FIGS. 8A and 8B.

According to such an exemplary embodiment, and as illustrated in FIG. 8A, the user units 300*a* to 300*c* and the enemy units 310*a* to 310*c* may be arranged facing each other.

According to an exemplary embodiment, a user may perform a swipe operation of sliding a finger from right to left, as illustrated in FIG. 8A. Therefore, since the user units may progress leftward on the screen in this case, the user units 300*a* to 300*d* on the left side of the screen may be user units positioned at the front.

According to this exemplary embodiment, the enemy units 310*a* to 310*c* may be arranged at the planned destinations 2*g*, 3*g*, and 4*g* of the user units 300*a* to 300*c*. When the user attempts to move user units 300*a* to 300*c* to the planned destinations 2*g*, 3*g*, and 4*g*, the moving processor 132 may request the battle processor 133 to perform a battle process between the units that are in conflict with each other.

According to the exemplary embodiment displayed in FIG. 8B, the user unit 300*a* may be defeated by the enemy unit 310*a*; the battle between the user unit 300*b* and the enemy unit 310*b* may end in a draw (the HPs of the two units do not become zero in the battle); and the user unit 300*c* may defeat the enemy unit 310*c*. In this case, the battle processor 133 may delete the user unit 300*a* and the enemy unit 310*c* from the map information 200. The battle processor 133 may cause the display processor 135 to display a screen from which the user unit 300*a* and the enemy unit 310*c* are deleted.

Thereafter, the battle processor 133 may notify the moving processor 132 that the battle has ended. The notification may include information on the enemy unit 310*b*. Upon receipt of the battle process end notification, the moving processor 132 may move the enemy unit 310*b* back by one cell in a direction indicated by the swipe operation (in this case, moving the enemy unit 310*b* to the left by one cell). Since the enemy unit 310*e*, being located immediately behind the enemy unit to be moved 310*b*, is arranged in the direction of movement of the enemy unit 310*b*, the moving processor 132 may additionally move the enemy unit 310*e* back by one cell. As a result, the enemy unit 310*b* moves to the cell 3*h*, and the enemy unit 310*e* moves to the cell 3*i*. The moving processor 132 may perform a process of moving the remaining user units 300*b* to 300*j* in a direction indicated by the swipe operation (leftward on the screen in the case of FIG. 8B).

The moving processor 132 may first determine the movement destinations of the user units (300*b* to 300*d*) that are, when a direction of moving the remaining user units (300*b* to 300*j*) of the user unit group is considered, positioned at the front of the user unit group. Looking first at user unit 300*b*, since the enemy unit 310*b*, which has tied in the battle, is moved back by one cell and the planned destination 3*g* is empty, the moving processor 132 may not fix the user unit 300*b*. Since the user unit 300*c* has defeated the enemy unit 310*c* and the planned destination 4*g* is empty, the moving processor 132 may not fix the user unit 300*c*. Since the planned destination 5*g* of the user unit 300*d* is a no-move area and not empty, the moving processor 132 may fix the user unit 300*d*. Since the planned destination 2*f* of the user unit 300*e* is empty because the user unit 300*a* has been defeated in the battle and the cell where the user unit 300*a* had been is now an empty cell, the moving processor 132 may not fix the user unit 300*e*. Since the planned destination 3*f* of the user unit 300*f* is empty, the moving processor 132 may not fix the user unit 300*f*. Since the planned destination 4*f* of the user unit 300*g* is empty, the moving processor 132 may not fix the user unit 300*g*. Since the user unit 300*d* is arranged at the planned destination of the user unit 300*h* and the planned destination is not empty, the moving processor 132 may fix the user unit 300*h*. Since the planned destination 2*e* of the user unit 300*i* is empty, the moving processor 132 may not fix the user unit 300*i*. Since the planned destination 3*e* of the user unit 300*j* is empty, the moving processor 132 may not fix the user unit 300*j*.

Thereafter, the moving processor 132 may collectively move the unfixed user units 300*b*, 300*c*, 300*e*, 300*f*, 300*g*, 300*i*, and 300*j* to the left by one cell. After this movement, the moving processor 132 may release the fixing of the fixed user units.

Therefore, as a result of a swipe operation performed by the user in FIG. 8A, the user unit 300*a* may be deleted from the map; the user units 300*d* and 300*h* may not move; and the user units 300*b*, 300*c*, 300*e*, 300*f*, 300*g*, 300*i*, and 300*j* may move to the left by one cell, as illustrated in FIG. 8B.

By performing movements such as those illustrated in FIGS. 5A to 8B, the user may cause the user unit 300*f* to arrive at a goal. Movement by one cell may consume one turn. If the user succeeds in moving a user unit to a goal within a certain number of turns, the game may proceed to the next stage; if not, the user may have to play the game again.

As such, according to an exemplary embodiment, it may become possible to provide a simple-to-operate yet deep game for causing a user unit to arrive at a goal, where the user unit group may be operated simply by two types of simple operations (a swipe operation, and a swipe operation while a user unit is being specified) as described above.

Turning now to exemplary FIG. 12, an exemplary embodiment of the present invention will be described. In the exemplary embodiment of FIG. 12, only configurations that are different from those included in previous embodiments may be described. All the configurations described in other embodiments may be included in the exemplary embodiment of FIG. 12 (and vice versa). The definitions of terms described in other exemplary embodiments may be the same in the exemplary embodiment of FIG. 12.

Figure 12:
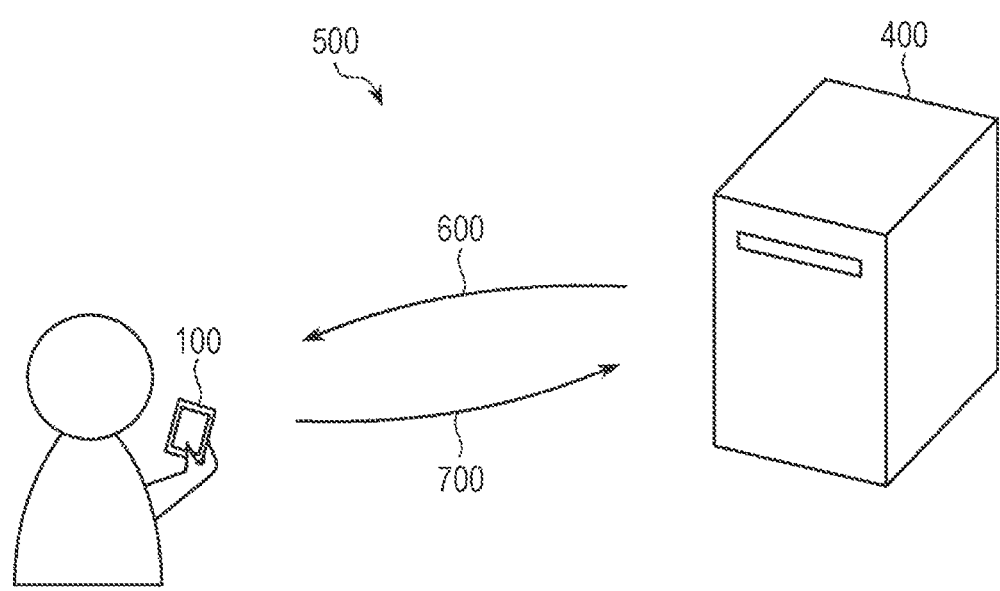
FIG. 12 is a schematic diagram illustrating an example configuration of a game system including a mobile terminal, and a server apparatus according to a second embodiment of the present invention.

FIG. 12 is a schematic diagram illustrating an exemplary configuration of a game system 500 including an information processing apparatus 100 and a server apparatus 400. As illustrated in FIG. 12, there may be an exemplary embodiment in which a computer according to an embodiment of the present invention may function as a server apparatus 400 connected to an information processing apparatus 100 via a network so as to be able to communicate with the information processing apparatus 100, and a game program according to an embodiment of the present invention may be executed by the server apparatus 400.

The server apparatus (computer) 400 may be an information processing apparatus that may include the control unit 130, which may be included in the information processing apparatus 100 as in previous embodiments, and which can execute a game program including some or all of the processes described in previous embodiments. The server apparatus 400 may receive instruction information 700 input by a player (in the case of a touch operation, position information indicating a touched position; and, in the case of a swipe operation, direction information indicated by the swipe operation) via the certain network. The server apparatus 400 transmits display information 600 for moving a user unit group including a plurality of user units to the information processing apparatus 100 via the network.

In other words, the server apparatus 400 may include the control unit 130, which may be included in the information processing apparatus 100 as in other embodiments. The control unit 130 may receive input data, which may be directly received from the input unit 110 according to other embodiments, from the information processing apparatus 100 via the network in the exemplary embodiment of FIG. 12. The control unit 130 may execute a process in accordance with the obtained input data, and the display processor 135 may output image data. The output image data may be transmitted via the network.

The information processing apparatus 100 may receive the result of playing the game from the server apparatus 400, and may display the result on the display unit 140. According to an exemplary embodiment, the play result may be displayed via a web browser, and the information processing apparatus 100 can accumulate information received from the server apparatus 400, for example, in a certain storage area (web storage) included in the web browser.

In this manner, the server apparatus 400 may include some or all of the elements of the control unit 130 described as being included in the information processing apparatus 100 in other exemplary embodiments, and the server apparatus 400 can be configured to transmit a game output result to the information processing apparatus 100 on the basis of an input given to the information processing apparatus 100. Accordingly, the server apparatus 400 may achieve the same advantageous effects as those achieved by the information processing apparatus 100 does in the exemplary embodiments where the information processing apparatus 100 provides these functions.

The concept of the present invention is not construed to be limited to those embodiments that have been previously described. Hereinafter, various modifications and alternative embodiments may be described.

Although an exemplary game in which enemy units appear as obstacles to user units has been discussed in the above embodiments, examples of obstacles to user units are not limited thereto. According to an exemplary embodiment, obstacle objects that prevent user units from progressing, such as rocks, blocks, walls, buildings, or puddles, may be arranged as obstacles. In the case of rocks, blocks, walls, or buildings, parameters such as HPs and defensive abilities may be set to these obstacles, and accordingly these obstacles may be destroyable. In the case of puddles, some sort of game processing may be performed to change the puddles to enable user characters to progress into the puddles (such as by freezing the puddles, or putting soil into the puddles to make a road).

Although an exemplary game in which the user moves user units while defeating enemy units has been discussed in the above embodiments, the game is not limited thereto. The method of operating objects (user units) according to the above-described embodiments may be applicable to any game that includes user-operable objects, and may include a process of collectively moving these objects. In that case, the method of operating objects (user units) according to the above-described embodiments may also be applicable not only to a game, but also to the case in which a group of objects displayed on a screen is collectively operated (to change display positions).

Although an exemplary game in which user units are moved on a map in the form of a grid of cells has been discussed in the above embodiments, the game is not limited thereto.

According to an exemplary embodiment, the game may be configured to allow user units to be freely movable on the game field. For example, the game may be configured to allow the user unit group to follow a position that the user touches on the input unit 110. While the user continuously specifies, with a touch operation, one user unit included in the user unit group, the game may be configured to allow the remaining user units to follow another position that the user touches with another finger on the input unit 110.

Although a battle process may be performed between a user unit and an enemy unit on the basis of their parameters in the above-described embodiments, according to an exemplary embodiment, a battle may be simplified by letting, if a unit that is moving comes into contact with an enemy, that moving unit always win.

In the above-described embodiments, as a method of operating user units, in the specification of collectively moving user units, an example has been discussed in which, while a particular unit is specified with a touch operation and that particular unit is fixed (not moved), the remaining user units may be caused to progress by one cell.

As a special method of moving the user units, the following examples may be performed, besides the above case.

Figure 9A:
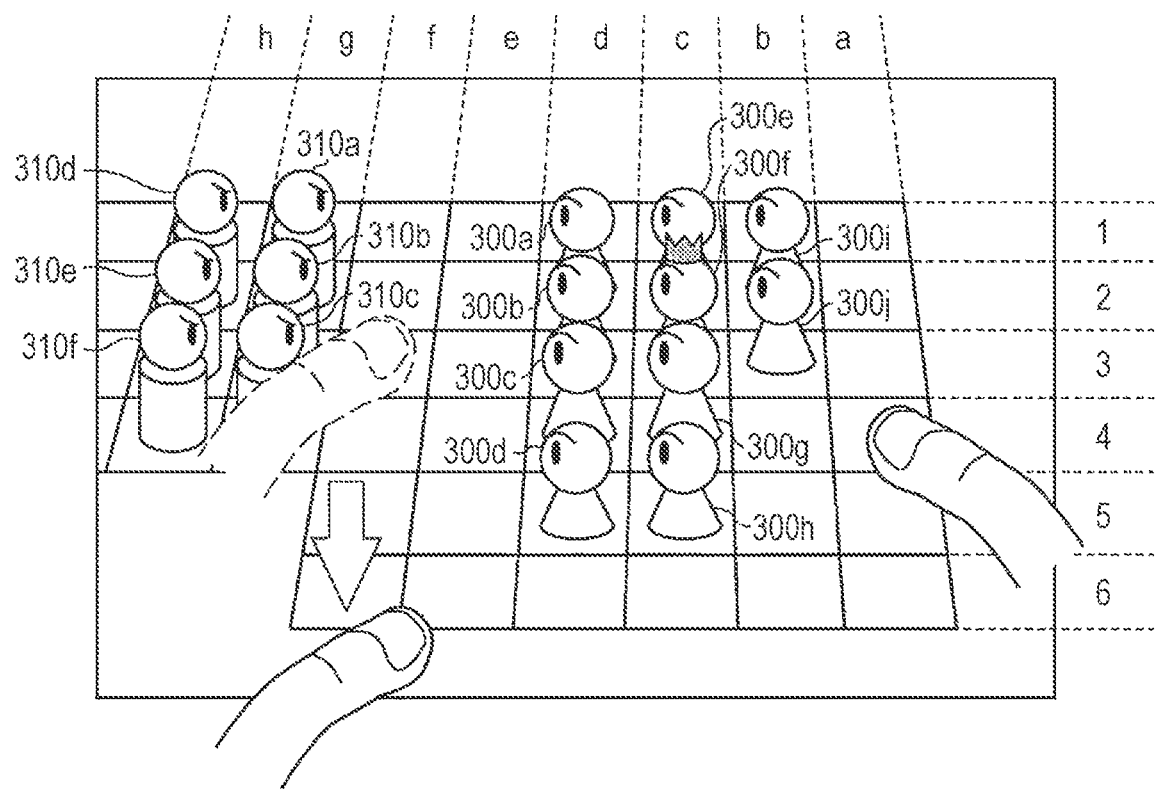
FIG. 9A is a screen diagram illustrating an example of changing the direction of each unit.
Figure 9B:
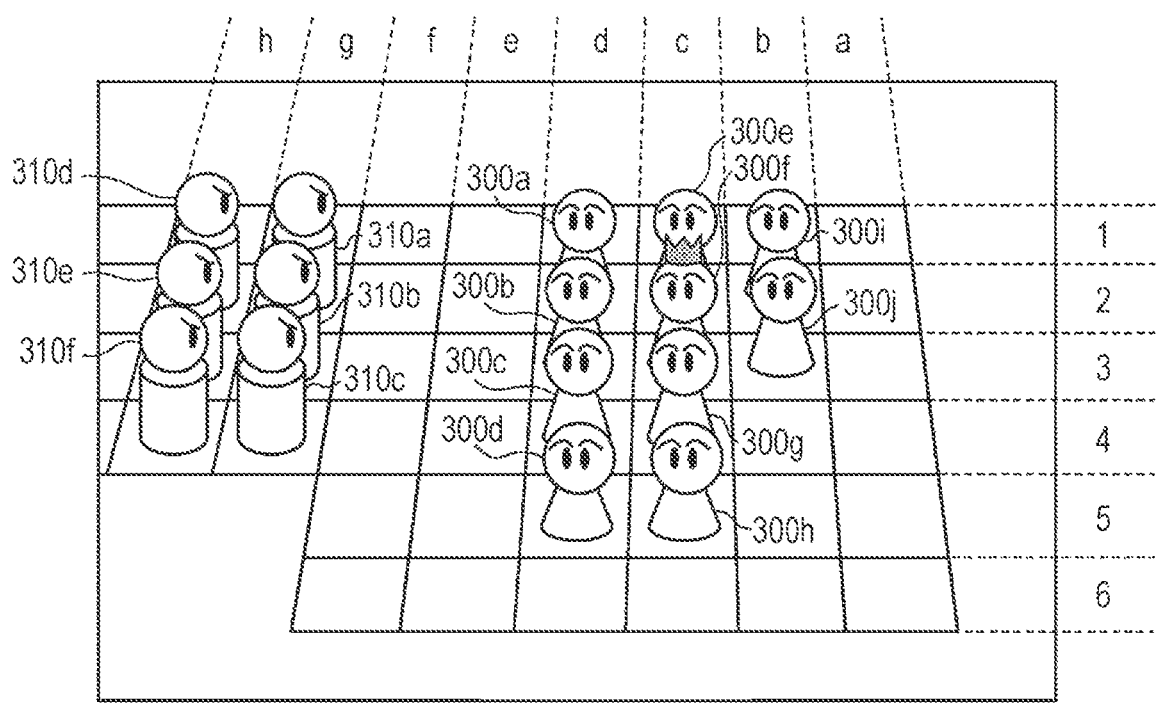
FIG. 9B is a screen diagram illustrating an example of changing the direction of each unit.

For example, according to one exemplary embodiment, a direction parameter may be set for each unit (user unit, enemy unit). As illustrated in FIG. 9A, a user may execute a swipe operation, while touching a portion other than the user units. In response to this, the user units directed leftward on the screen, as illustrated in exemplary FIG. 9A, may be displayed so as to be directed to a different side on the screen, as illustrated in exemplary FIG. 9B (where the units are directed to face the screen).

That is, according to an exemplary embodiment where the input unit 110 detects a swipe operation while detecting a touch operation that specifies a portion where no user unit is arranged, the information processing apparatus 100 may execute a process of changing the direction of each user unit and a process of displaying that result.

Figure 10:
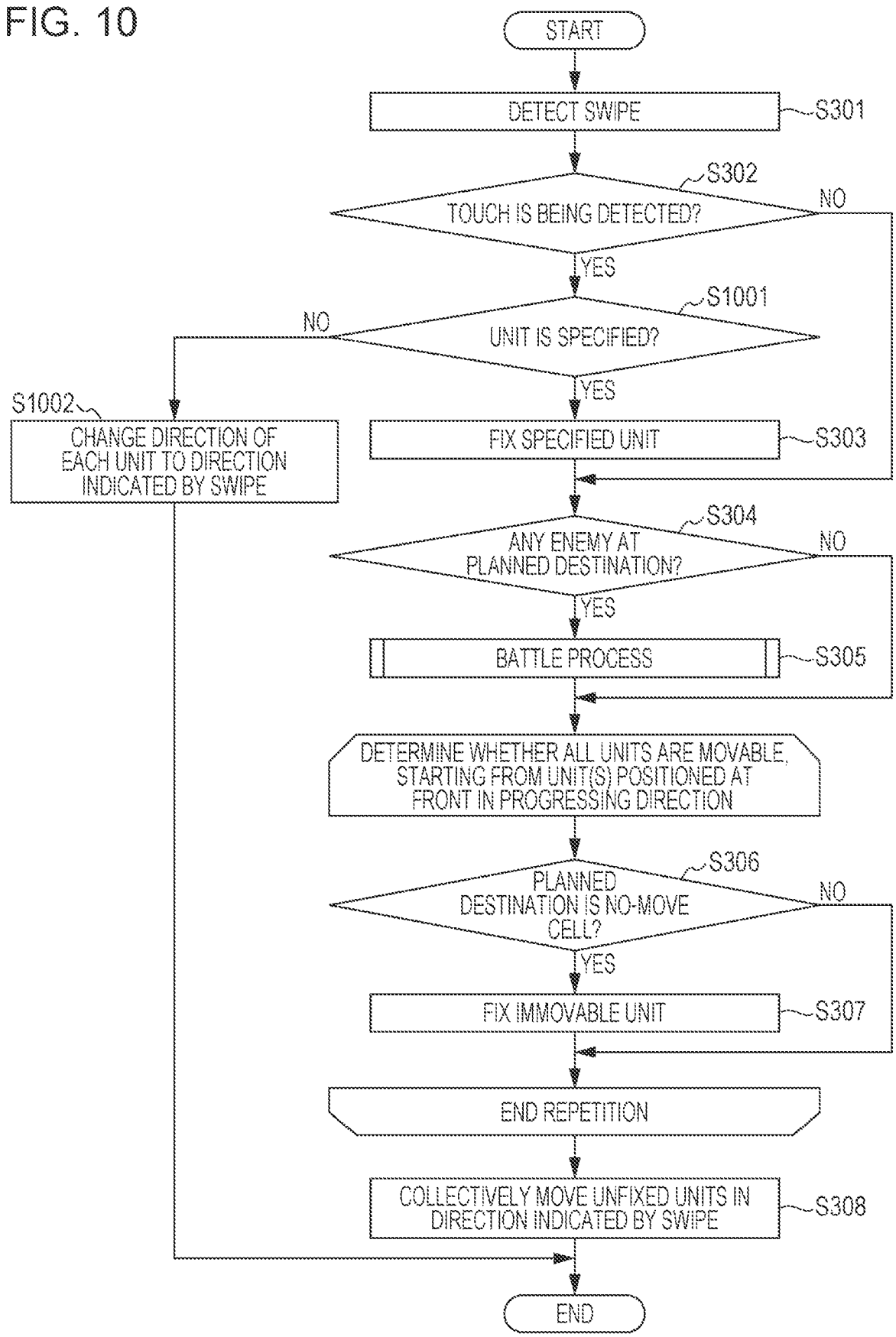
FIG. 10 is a flowchart illustrating an exemplary embodiment of the operation of the information processing apparatus in the case where the example of changing the direction of each unit is conducted.

The operation of the information processing apparatus 100 in the case of including this direction changing operation in this case can be performed by, for example, changing the flowchart illustrated in FIG. 3 used in previous embodiments to the flowchart illustrated in FIG. 10. Specifically, the flowchart in exemplary FIG. 10 may add certain steps to FIG. 3, which may be as follows. First, in the case where there is a touch operation, it may be determined whether a portion specified by that touch operation is a user unit or a portion other than the user units (step S1001); second, in the case where a portion other than the user units is specified, a direction changing process of changing the direction of each user unit to a direction indicated by the swipe operation (step S1002) may be performed.

In the case where a direction is set for each user unit as described above, if the game is set to allow each user unit to move only in its directed direction, the user may have to take into consideration how to move each user unit in order to arrive at a goal. Therefore, a more strategic game can be provided.

In the case of performing a battle, the following processes may be performed. That is, for example, in the case where a user unit (enemy unit) attacks an enemy unit (user unit), if the user unit (enemy unit) attacks the enemy unit (user unit) from behind, the enemy unit (user unit) may receive damage that is twice as powerful as that received when attacked from the front. In the case of attacking an enemy unit (user unit) from its side, the enemy unit (user unit) may receive damage that is 1.5 times more powerful. In doing so, a more strategic game can be provided.

Other methods of movement, for example, a configuration that executes a rotational movement, may also be implemented.

Figure 11A:
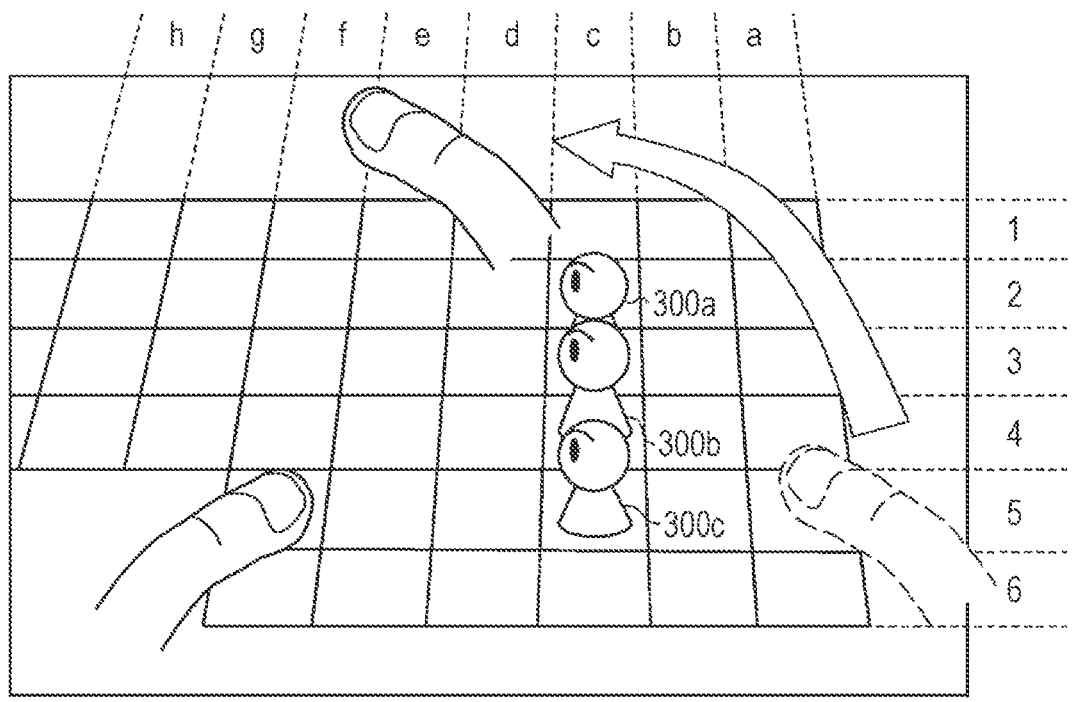
FIG. 11A is a screen diagram illustrating an example of rotationally moving each unit.
Figure 11B:
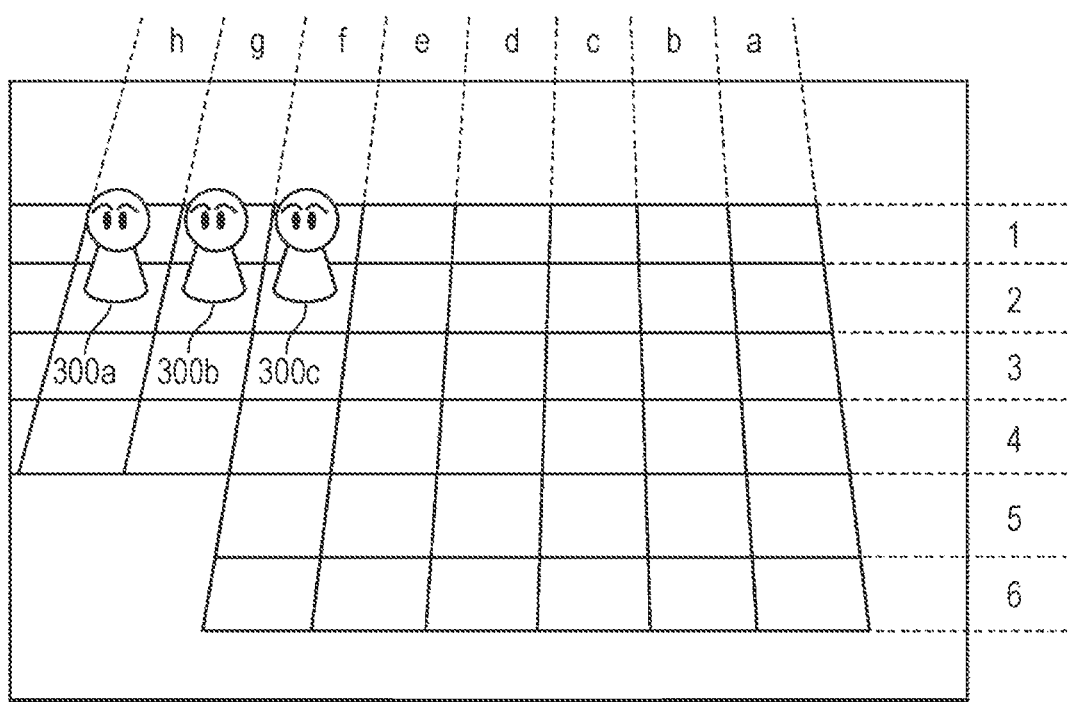
FIG. 11B is a screen diagram illustrating an example of rotationally moving each unit.

Exemplary FIGS. 11A and 11B illustrate one such specific example. FIGS. 11A and 11B are diagrams illustrating an example by which user units may be moved by a rotational movement.

For example, according to the exemplary embodiment illustrated in FIG. 11A, a user unit 300a may be arranged in the cell 3c, a user unit 300b may be arranged in the cell 4c, and a user unit 300c may be arranged in the cell 5c.

According to this exemplary embodiment, a user may perform a swipe input in the shape of a circular arc, while touching the cell 5f.

In response to this, as illustrated in FIG. 11B, the user unit group may move to positions after a rotational movement is performed around the cell (5, *f*), which is the position that the user is touching. That is, the user unit 300a may move to the cell 2h, the user unit 300b may move to the cell 2g, and the user unit 300c may move to the cell 2f.

Note that the angle of rotation in a rotational movement may depend on an angle formed by the start point and the end point of a swipe operation in the shape of a circular arc, and the position of a touch operation, or the angle of rotation in a rotational movement as a result of one swipe operation in the shape of a circular arc may be set to a predetermined value (such as 90 degrees).

Such moving processes may be performed.

Although the game according to the above-described embodiments may have as its win condition causing the user unit 300*f* with a crown to arrive at a goal, according to an alternative exemplary embodiment, the game may instead have as its win condition causing any user unit to arrive at a goal, instead of a specific user unit.

Although the storage unit 120 may be configured to retain group information in the above-described embodiments, according to an exemplary embodiment, the group information may be retained to enable the user unit group to collectively move, and other information may be retained as long as that information enables the user unit group to collectively move. For example, the information may be one in which a specific user unit of the user unit group is associated with another user unit, or the information may be implemented by a configuration where each user unit has, as its parameter, information indicating that the user unit is a unit that assumes to move collectively with other user units.

Although a game of the type where the user operates a user character to arrive at a goal has been described as an example in the above-described embodiments, according to an exemplary embodiment, the operation method discussed in the above-described embodiments may also be applicable to other games.

For example, a target to be operated may be a card in a card game. As a method of using the operation method discussed in the above-described embodiments, the operation method can be used to exchange cards in a deck having a plurality of cards in a card game. That is, while cards to be left in a deck having a plurality of cards may be being specified with a touch operation, a swipe operation may be performed with another finger, thereby changing untouched cards to other cards. Alternatively, if each card has a face and a back, a swipe operation may invert the untouched cards from one side to the other, instead of changing the cards.

According to an alternative exemplary embodiment, in a game where buildings (facilities) are placed on a map and users attack and defend each other, like a strategy game, the operation method discussed in the above-described embodiments may be applicable to an operation of leaving one or some of the buildings (facilities) and moving the rest of the buildings (facilities) at the same time. For example, buildings (facilities) in the above-mentioned strategy game may include those for attacking enemy characters (such as cannons or houses (places) where characters are waiting to attack), those that protect the user's map (area) from enemy characters' attacks (such as walls or fences), those for accumulating costs (such as virtual currency, fuels, or foods) used in the game, and those for training the user's characters. In other words, while one or more not-to-be-moved buildings are being touched, when a swipe operation is performed with another finger, the remaining buildings (untouched buildings) may be moved in a direction indicated by the swipe operation. In addition, the rotational movement discussed in a previous embodiment may also be applied.

Furthermore, the operation method discussed in the above-described embodiments may also be applicable to a game where the board can be moved (such as a puzzle game), where a portion of the board is specified by a touch operation and the remaining board is moved by a swipe operation.

Accordingly, the operation method discussed in the above-described embodiments in which, while a touch operation is being performed, a swipe operation may be performed with another finger can be used in various applications.

In the above-described embodiments, as the operation of leaving a certain unit as it is and collectively moving the remaining units, a swipe operation may be performed while touching the certain unit. However, the operation is not limited to that described above. Alternatively, while the certain unit is touched to be selected, the finger that is touching the certain unit may be released, and then a swipe operation may be performed. After the movement as a result of the swipe operation, the certain user unit may be de-selected. In the case of this operation method, the user may no longer need to keep touching a user unit that the user does not want to move.

Although the user units may move one cell at a time in the above-described embodiments, the number of cells that the user units can move at a time may not be limited to one. The number of cells that the user units can move at a time may be a predetermined number greater than or equal to two, or may be a number in accordance with the distance between the start point and the end point of a swipe operation.

Although it has been described in the above-described embodiments that a swipe operation indicates only one direction (a straight line connected between the start point and the end point), according to an exemplary embodiment, a user may optionally perform an operation of inputting a polygonal chain of two line segments while continuing to touch the device. In this case, it may be regarded that two swipe operations are performed in which the vertex between the two line segments serves as the first end point and the second start point.

Although only one unit can be arranged in one cell in the above-described embodiments, according to an exemplary embodiment the number of units that can be arranged in one cell may not be limited to one. A plurality of units may be arranged in one cell, or one cell may be arranged so as to occupy a plurality of cells.

In the above-described embodiments, for the user unit group, group information associated by the associating unit 134 may be stored in the storage unit 120. That is, the above-described embodiments describe an example in which the user unit group may be predetermined by the game program. However, the user unit group is not limited to that described above.

That is, the game program may have the function of specifying, by the user, user units that move as a user unit group. There are various methods of specifying user units. In one example, user units included in a range specified by a so-called drag operation may be specified as a user unit group.

In the above-described embodiments, one user unit may be specified by a touch operation and is not moved. However, according to an exemplary embodiment, a plurality of user units rather than a single user unit may be specified not to be moved. In addition, for example, a cell for specifying a column or a row may be provided at the end of the map discussed in the above-described embodiments, and, if a swipe operation is performed while touching that cell, user units arranged in the column or row specified by touching that cell may be fixed as user units not to be moved. Alternatively, a plurality of user units arranged in the same column or row adjacent to (consecutive to) a user unit specified by a touch operation performed by the user may be fixed as user units not to be moved. Conversely, user units other than those arranged in the specified column or row may be fixed as user units not to be moved. That is, user units arranged in the specified column or row may be moved while keeping the relative positional relationships among the user units that are arranged. The method of specifying user units to move may be one that uses a cell capable of specifying a column or a row, or one that specifies a plurality of user units arranged in the same column or row based on one specified user unit. For example, when one user unit is specified, a button for selecting each column or row may be displayed, and, in response to selecting the button, a plurality of user units arranged in the same column or row adjacent to (consecutive to) the specified user unit can be specified. Alternatively, when one user unit is specified, a plurality of user units arranged in the same column or row adjacent to (consecutive to) that user unit may be automatically specified.

Although the above-described embodiments have discussed an example in which a user unit and an enemy unit fight against each other, and, in the case of a draw (the HPs of the two units remain), the user unit progresses by one cell in a direction indicated by a swipe operation, and the enemy unit moves back by one cell, the embodiments are not limited to this example. According to an exemplary embodiment, when a user unit and an enemy unit fight against each other and the fight ends in a draw, both the user unit and the enemy unit may remain at their current positions.

According to an exemplary embodiment, a progress screen of the game may be displayed in the form of a web display on an information processing apparatus 100 on the basis of data generated by the server apparatus 400, and other menu screens (although not particularly discussed in the above-described embodiments, for example, if user units can use any special ability, a menu used by the user to specify the use of that special ability; if there are a plurality of types of user units, a menu for specifying which type to use; or a menu for entering an input to start, restart, or give up the game) may be displayed in the form of a native display by a native application installed in the information processing apparatus 100. In doing so, the game may be a hybrid game where the server apparatus 400 and the information processing apparatus 100 each perform some of the processes.

According to an exemplary embodiment, each function unit of the information processing apparatus 100 may be implemented by a logic circuit (hardware) formed in an integrated circuit (integrated circuit (IC) chip) or the like or by software using a central processing unit (CPU). In the latter case, the information processing apparatus 100 or the server apparatus 400 may include a CPU that executes instructions of the game program which is software implementing the individual functions, a read-only memory (ROM) or storage device (referred to as a "recording medium") on which the game program and various kinds of data are recorded in a computer (or CPU) readable manner, and a random-access memory (RAM) to which the game program is loaded. The computer (or the CPU) may read the game program from the recording medium and executes the game program, thereby attaining the object of the present invention. As the recording medium, a "non-transitory tangible medium", for example, a tape, a disc, a card, a semiconductor memory, or a programmable logic circuit can be used. In addition, the game program may be provided to the computer via any given transmission media capable of transmitting the game program (such as a communication network or a broadcast wave). The present invention can be implemented as a data signal on a carrier wave, in which the game program is embodied by electronic transmission.

The game program can be written in, for example, a script language such as ACTIONSCRIPT or JAVASCRIPT, an object-oriented programming language such as OBJECTIVE-C or JAVA, or a markup language such as HyperText Markup Language 5 (HTML5). According to another exemplary embodiment, a game system (e.g., the game system 500) may include an information processing terminal (e.g., the information processing apparatus 100) that may include units that implement some of functions implemented by the game program, and may include a server (e.g., the server apparatus 400) that may include units that implement the rest of the functions different from the some functions.

Although the present invention has been described on the basis of the drawings and the embodiments, it should be noted that various modifications or changes can be made by those skilled in the art on the basis of the present disclosure. Therefore, it should be noted that these modifications or changes fall within the scope of the present invention. For example, the functions included in each unit or each step may be relocatable without logically contradicting each other. A plurality of units or steps can be combined as one unit or step, or one unit or step can be separated into a plurality of units or steps.

Configurations discussed in the above-described embodiments and modifications may also be appropriately combined.

Still other exemplary embodiments may be described. For example, a game program, a computer control method, and an information processing apparatus according to exemplary embodiments may provide advantageous effects achieved by the embodiments.

(a) A game program according to an exemplary embodiment a game program that processes progress of a game for moving a plurality of objects arranged on a game field, the game program causing a computer to implement: an accepting function that accepts operation information regarding a touch operation performed by a user, from a certain input face capable of detecting the touch operation; an associating function that associates the plurality of objects as a group; a moving function that moves, in a case where the operation information is a direction operation indicating a certain direction, the plurality of associated objects as a group in the direction indicated by the direction operation; and a display processing function that displays the game field and the plurality of objects arranged on the game field on a screen of the game, and, in a case where a moving process is performed by the moving function, moves and displays the plurality of objects in accordance with the moving process. Upon acceptance of the direction operation as the operation information while a specifying operation that specifies a first object that is any of the plurality of objects is being accepted as the operation information, the moving function moves remaining objects, excluding the first object from the plurality of objects, as a group in the direction indicated by the direction operation.

A computer control method according to an exemplary embodiment may be a computer control method for controlling a computer that processes progress of a game for moving a plurality of objects arranged on a game field, the method can include: an accepting step of accepting operation information regarding a touch operation performed by a user, from a certain input face capable of detecting the touch operation; an associating step of associating the plurality of objects as a group; a moving step of moving, in a case where the operation information is a direction operation indicating a certain direction, the plurality of associated objects as a group in the direction indicated by the direction operation; and a display processing step of displaying the game field and the plurality of objects arranged on the game field on a screen of the game, and, in a case where a moving process is performed in the moving step, displaying the plurality of objects in accordance with the moving process. Upon acceptance of the direction operation as the operation information while a specifying operation that specifies a first object that is any of the plurality of objects is being accepted as the operation information, the moving step moves remaining objects, excluding the first object from the plurality of objects, as a group in the direction indicated by the direction operation.

A computer according to an exemplary embodiment my be an information processing apparatus that processes progress of a game for moving a plurality of objects arranged on a game field, including: an accepting unit that accepts operation information regarding a touch operation performed by a user, from a certain input face capable of detecting the touch operation; an associating unit that associates the plurality of objects as a group; a moving unit that moves, in a case where the operation information is a direction operation indicating a certain direction, the plurality of associated objects as a group in the direction indicated by the direction operation; and a display processing unit that displays the game field and the plurality of objects arranged on the game field on a screen of the game, and, in a case where a moving process is performed by the moving unit, displays the plurality of objects in accordance with the moving process. Upon acceptance of the direction operation as the operation information while a specifying operation that specifies a first object that is any of the plurality of objects is being accepted as the operation information, the moving unit moves remaining objects, excluding the first object from the plurality of objects, as a group in the direction indicated by the direction operation.

Accordingly, with simple operations that may be one touch operation and one swipe operation, the user can, while leaving an object specified with the touch operation, collectively move the remaining objects in a direction indicated by the swipe operation. That is, without forcing the user to perform a complex operation, a plurality of objects can be moved without moving a particular object. Therefore, an easy-to-operate game in which a plurality of objects can perform complex movement can be provided.

(b) In the game program according to (a), a no-move area or an obstacle object into which each of the plurality of objects is incapable of progressing may be set on the game field; and, in movement by the moving process, in a case where a second object that is any of the remaining objects can be prevented from moving by the no-move area or the obstacle object, the moving function does not move the second object.

Accordingly, when the user can move a plurality of objects, in the case where there is an object whose planned destination includes an immovable object, that object remains at its position. Therefore, although the specification defines that basically a plurality of objects move as a whole, there are exemplary cases where an object does not move. Depending on the user's way of moving the objects, the user may not move some of the objects on purpose. Therefore, a more strategic game can be provided.

(c) In the exemplary game program according to (a) or (b), in a case of not moving the second object in the direction indicated by the direction operation and in a case where there is a remaining object other than the second object on a straight line in the direction indicated by the direction operation, the moving function does not move the remaining object other than the second object either.

Accordingly, in the exemplary case where there is an object whose destination includes an immovable object, that object cannot move either. In that case, the user can plan a strategy to move an object group while avoiding immovable objects as much as possible, or a strategy to purposefully have an immovable object to make the gameplay more advantageous. Therefore, a more strategic game can be provided.

(d) In the exemplary game program according to any one of (a) to (c), each of the plurality of objects has a direction, and the game program further causes the computer to implement a direction changing function that, upon acceptance of the direction operation as the operation information while a specifying operation that specifies a portion other than the plurality of objects is being accepted as the operation information, changes the direction of each of the plurality of objects to the direction indicated by the direction operation.

Accordingly, in the exemplary case where each of the plurality of objects has a direction, the directions of the plurality of objects can be easily and collectively changed by performing a swipe operation toward a direction that the user wants to direct the objects, while touching a position that specifies no object. For example, if the game includes a battle process with enemies, the game may be configured to change the magnitude of damage in accordance with the direction of receiving the attack (attacking from the front, attacking from the side, or attacking from behind), thereby providing a more strategic game. As in other exemplary embodiments described herein, this is merely an example and is non-limiting.

The present invention is widely applicable to any given computers such as smart phones, tablet terminals, mobile phones, home video game consoles, personal computers, server apparatuses, workstations, or mainframes.

What is claimed is:

1. A computer program product embodied on a non-transitory computer readable medium, comprising code executable by a computer arranged to operate a computer game, to cause the computer to carry out steps of:

storing, in a storage module, a plurality of virtual objects and the arrangements of those virtual objects on a game field;

accepting, via an input face configured to detect a touch operation, a touch operation of a user, and determining whether said touch operation corresponds to a position of one of the virtual objects or whether said touch operation does not correspond to the position of the one of the virtual objects, in a case where said touch operation corresponds to the position of the one of the virtual objects, designating the one of the virtual objects as a selected virtual object;

accepting, via the input face, a swipe operation of the user, the swipe operation comprising a swipe direction;

determining, based on the swipe operation of the user, multiple objects in the plurality of virtual objects associated with the swipe operation; and determining that the swipe operation does not correspond to the position of the one of the virtual objects, and adjusting a directional orientation of each of the plurality of objects to the swipe direction.

2. The computer program product of claim 1, wherein the computer is further configured to perform steps of:

accepting, via the input face, a second touch operation of the user after receiving the touch operation of the user corresponding to the position of the one of the virtual objects, wherein said second touch operation does not correspond to the position of the one of the virtual objects;

based on receipt of the second touch operation of the user, ending a designation of the one or more virtual objects as the selected virtual object;

following accepting of the second touch operation, accepting, via the input face, a second swipe operation of the user, the second swipe operation comprising a second swipe direction; and moving each of the plurality of objects in the second swipe direction.

3. The computer program product of claim 2, wherein the computer is further configured to perform a step of:

designating a position of the second touch operation as a center of a movement arc; and wherein moving each of the plurality of objects comprises rotationally moving each of the plurality of objects around the movement arc.

4. A system comprising at least one processor, at least one memory module including computer program code, and at least one terminal apparatus of a player user having a graphical user interface, the at least one memory module and the computer program code configured to, with the processor, cause the system to perform steps of:

storing, in a storage module, a plurality of virtual objects and the arrangements of those virtual objects on a game field;

accepting, via an input face configured to detect a touch operation, a touch operation of a user, and determining whether said touch operation corresponds to a position of one of the virtual objects or whether said touch operation does not correspond to the position of the one of the virtual objects, in a case where said touch operation corresponds to the position of the one of the virtual objects, designating the one of the virtual objects as a selected virtual object;

accepting, via the input face, a swipe operation of the user, the swipe operation comprising a swipe direction;

determining, based on the swipe operation of the user, multiple objects in the plurality of virtual objects associated with the swipe operation; and determining that the swipe operation does not correspond to the position of the one of the virtual objects, and adjusting a directional orientation of each of the plurality of objects to the swipe direction.

5. The system of claim 4, wherein the system is further configured to perform steps of:

accepting, via the input face, a second touch operation of the user after receiving the touch operation of the user corresponding to the position of the one of the virtual objects, wherein said second touch operation does not correspond to the position of the one of the virtual objects;

based on receipt of the second touch operation of the user, ending a designation of the one or more virtual objects as the selected virtual object;

following accepting of the second touch operation, accepting, via the input face, a second swipe operation of the user, the second swipe operation comprising a second swipe direction; and moving each of the plurality of objects in the second swipe direction.

6. The system of claim 5, wherein the system is further configured to perform a step of:

designating a position of the second touch operation as a center of a movement arc; and wherein moving each of the plurality of objects comprises rotationally moving each of the plurality of objects around the movement arc.

7. An information processing apparatus comprising at least one processor, at least one memory configured to store computer program code, and a display, the computer program code configured to, when executed with the processor, cause the information processing apparatus to perform steps of:

storing, in the memory, a plurality of virtual objects and the arrangements of those virtual objects on a game field;

accepting, via an input face of the display configured to detect a touch operation, a touch operation of a user, and determining whether said touch operation corresponds to a position of one of the virtual objects or whether said touch operation does not correspond to the position of the one of the virtual objects, in a case where said touch operation corresponds to the position of the one of the virtual objects, designating the one of the virtual objects as a selected virtual object;

accepting, via the input face, a swipe operation of the user, the swipe operation comprising a swipe direction;

determining, based on the swipe operation of the user, multiple objects in the plurality of virtual objects associated with the swipe operation; and determining that the swipe operation does not correspond to the position of the one of the virtual objects, and adjusting a directional orientation of each of the plurality of objects to the swipe direction.

8. The information processing apparatus of claim 7, wherein the information processing apparatus is further configured to perform:

accepting, via the input face, a second touch operation of the user after receiving the touch operation of the user corresponding to the position of the one of the virtual objects, wherein said second touch operation does not correspond to the position of the one of the virtual objects; and based on receipt of the second touch operation of the user, ending a designation of the one of the virtual objects as the selected virtual object.

9. The information processing apparatus of claim 8, wherein the information processing apparatus is further configured to perform:

following accepting of the second touch operation, accepting, via the input face, a second swipe operation of the user, the second swipe operation comprising a second swipe direction; and moving each of the plurality of objects in the second swipe direction.

10. The information processing apparatus of claim 9, wherein the information processing apparatus is further configured to perform:

designating a position of the second touch operation as a center of a movement arc; and wherein moving each of the plurality of objects comprises rotationally moving each of the plurality of objects around the movement arc.

11. The information processing apparatus of claim 10, wherein the second swipe operation has a start point, an end point, and an angle defined by the start point and end point; and wherein an angle of rotation of a movement of the plurality of objects is based on the angle defined by the start point and the end point.

12. The information processing apparatus of claim 10, wherein an angle of rotation of a movement of the plurality of objects is set to a predetermined value.

13. The information processing apparatus of claim 9, wherein accepting, via the input face, the second swipe operation of the user further comprises determining that the user has held a finger in place after the second touch operation; and
- wherein moving each of the plurality of objects in the second swipe direction is executed upon receipt of the second swipe operation made while the user is simultaneously touching a position of the second touch operation.

14. The information processing apparatus of claim 7, wherein the information processing apparatus is further configured to perform:
- storing, in the storage module, a position of a predetermined area on a game field;
- detecting, after the swipe operation of the user, whether the predetermined area is occupied; and
- upon detecting that the predetermined area is occupied, clearing the map and advancing a state of the game.

15. The information processing apparatus of claim 14, wherein detecting whether the predetermined area is occupied comprises detecting whether any virtual object in the plurality of virtual objects is in the position of the predetermined area.

16. The information processing apparatus of claim 14, wherein the plurality of virtual objects comprises a virtual object having a predetermined visual attribute different from other virtual objects in the plurality of virtual objects, and wherein detecting whether the predetermined area is occupied comprises detecting whether the virtual object having the predetermined attribute is in the position of the predetermined area.

17. The information processing apparatus of claim 7, wherein the information processing apparatus is further configured to perform:
- accepting, from the input face, a row or column select touch operation of a user corresponding to a position of a row or column select cell on the game field; and
- designating a row or column of virtual objects in the plurality of virtual objects as selected virtual objects.

18. The information processing apparatus of claim 17, wherein the information processing apparatus is further configured to perform:
- maintaining the row or column of virtual objects as selected virtual objects, and while maintaining the row or column of virtual objects as selected virtual objects, moving the plurality of virtual objects other than the selected virtual objects on the game field.

19. The information processing apparatus of claim 17, wherein the information processing apparatus is further configured to perform:
- prior to a step of accepting a row or column select touch operation, designating the one of the virtual objects as the selected virtual object; and
- wherein designating the row or column of virtual objects in the plurality of virtual objects as the selected virtual objects comprises selecting virtual objects in a same row as a selected virtual object or selecting virtual objects in a same column as a selected virtual object.

20. The information processing apparatus of claim 7, wherein adjusting the directional orientation of each of the plurality of objects to the swipe direction comprises:
- providing, on the game field, a grid of cells comprising a plurality of rows of cells extending in a first direction and a plurality of columns of cells extending in a second direction perpendicular to the first direction; and
- adjusting the directional orientation of each of the plurality of objects from the first direction to the second direction.

* * * * *